United States Patent [19]

Miyamoto

[11] Patent Number: 5,751,363
[45] Date of Patent: May 12, 1998

[54] SYSTEM AND METHOD FOR CODING AND/OR DECODING IMAGE-ADAPTIVE SPLIT REGION OF MOTION PICTURE

[75] Inventor: Yoshihiro Miyamoto, Tokyo, Japan

[73] Assignee: NEC Corporation, Tokyo, Japan

[21] Appl. No.: 601,565

[22] Filed: Feb. 14, 1996

[30] Foreign Application Priority Data

Feb. 15, 1995 [JP] Japan ................... 7-026377

[51] Int. Cl.$^6$ ......................... H04N 7/32; H04N 7/30
[52] U.S. Cl. .................. 348/416; 348/402; 348/407; 348/699
[58] Field of Search ...................... 348/417, 408, 348/409, 415, 416, 400, 390, 384, 699, 700, 402, 407; 386/27, 33, 109, 111; H04N 7/32, 7/30

[56] References Cited

U.S. PATENT DOCUMENTS

| | | | |
|---|---|---|---|
| 5,103,488 | 4/1992 | Gemello et al. | 348/417 |
| 5,225,904 | 7/1993 | Golin et al. | 348/410 |
| 5,251,028 | 10/1993 | Iu | 348/416 |
| 5,422,963 | 6/1995 | Chen et al. | 348/416 |
| 5,537,155 | 7/1996 | O'Connell et al. | 348/699 |
| 5,572,258 | 11/1996 | Yokoyama | 348/415 |
| 5,608,458 | 3/1997 | Chen et al. | 348/413 |

FOREIGN PATENT DOCUMENTS

| | | | |
|---|---|---|---|
| 1-228384 | 9/1989 | Japan | H04N 7/32 |
| 3-133290 | 6/1991 | Japan | H04N 7/30 |
| 4-186986 | 7/1992 | Japan | H04N 7/32 |

OTHER PUBLICATIONS

"A New Motion Compensation Method for Image Sequence Coding Using Hierarchical Grid Interpolation", Huang et al, IEEE, Feb. 1994, pp. 42–52.

"Spatio-Temporal Segmentation of Image Sequences for Object-Oriented Low Bit-Rate Image Coding", Wu et al, IEEE, Sep. 1995, pp. 406–409.

"Foreground/Background Segmentation of Color Images By Integration of Multiple Cues", Huang et al, IEEE, Sep. 1995, pp. 246–249.

"Motion Estimation for Region Based Video Coding", Dang et al, IEEE, Sep. 1995, pp. 189–192.

"Visual Pattern Image Sequence Coding", Silsbee et al, IEEE, Aug. 1993, pp. 291–301.

Primary Examiner—Tommy P. Chin
Assistant Examiner—Vu Le
Attorney, Agent, or Firm—Sughrue, Mion, Zinn, Macpeak & Seas, PLLC

[57] ABSTRACT

In a coding system, an input picture is split into regions with adaptive configurations to a reference picture, a selected region with precedence data is detected of its configuration and of its relative motion to a corresponding region of the reference picture, a prediction region is generated from the corresponding region of the reference picture and the relative motion, a difference region is determined between the selected region and the prediction region, and the precedence data, detected configuration, relative motion and difference region are coded. In a decoding system, a decoded prediction region is generated from a decoded relative motion and a corresponding region of a reference picture selected by a decoded precedence data, and a decoded difference region is added to the decoded prediction region to obtain a decoded picture region, which is configuration-corrected by a decoded configuration data, before synthesizing a plurality of decoded picture regions to obtain a synthesized picture region.

12 Claims, 15 Drawing Sheets

FIG. 16
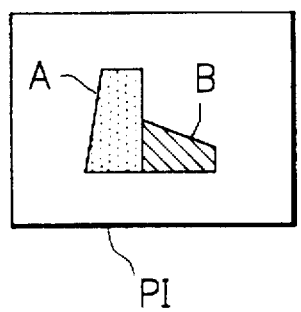
PD (A,B)
= (PD (A) ,PD (B) )
CD (A,B) ~ (P (A) >P (B) )
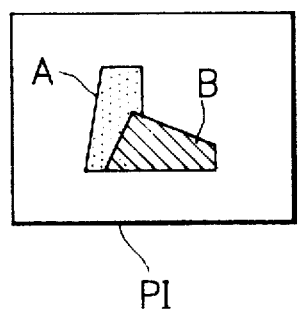
PD (A,B)
= (PD (A) ,PD (B) )
CD (A,B) ~ (P (A) <P (B) )

SYSTEM AND METHOD FOR CODING AND/ OR DECODING IMAGE-ADAPTIVE SPLIT REGION OF MOTION PICTURE

BACKGROUND OF THE INVENTION

The present invention generally relates to a motion picture coding and/or decoding system and a motion picture coding and/or decoding method, and particularly, to a system and a method for coding and/or decoding an image-adaptive split region of a motion picture to permit a reproduction of the split region with a significant configuration.

DESCRIPTION OF THE RELATED ART

Recent years have observed an increased need for recording and/or transmitting a temporal sequence of motion pictures in an effectively compressing manner.

To implement such a need, a typical system includes an encoder for encoding a sequence of input motion pictures each respectively into a sequence of binary symbols as compressed-codes thereof (hereafter sometimes "bitstream" or "coded picture"), a recording medium for recording a sequence of such coded pictures or a transmission line or radio channel for transmitting the same, and a decoder for decoding the coded picture sequence to provide a sequence of decoded motion pictures (hereafter sometimes each respectively "decoded picture") representative of the input picture sequence. The decoded picture sequence is output to a display for a reproduciton of the input picture seqeunce.

In the encoder, a motion picture input thereto in a current frame of time is always concerned and called "current input picture" (hereafter sometimes "current picture" or "input picture"). The input picture is necessarily compared with a so-called "reference picture", which is a picture representative of an input picture in a previous frame of time (hereafter sometimes "previous picture"), to obtain a set of inter-frame motion data therebetween. The reference picture is further employed in combination with the motion data to generate a motion-compensated inter-frame prediction picture (hereafter sometimes "prediction picture") of the input picture.

The prediction picture is subtracted from the input picture to obtain a set of reduced pixel data representing a "difference picture" therebetween, which pixel data are compressedly coded by a first coding including an orthogonal transformation and a quantization, to provide a set of coded compressed data (hereafter sometimes "compressed data").

The compressed data as well as the motion data are compressedly symbolized by a second coding to provide the bitstream as the coded picture to be recoded or transmitted.

The compressed data may be decompressedly decoded by a local decoding in the encoder to obtain a local decoded difference picture, which may be added to the prediction picture to generate a "local decoded picture", which may be employed as the reference picture in a subsequent frame of time and for a monitoring at the encoder side.

In the decoder, the bitstream is decoded by a first decoding to obtain a set of decoded compressed data and a set of decoded motion data. The decoded compressed data are decompressedly decoded by a second decoding including an inverse quantization and an inverse orthogonal transformation to obtain a decoded difference picture. The decoded motion data are employed in combination with a reference picture at the decoder side to generate a decoded prediction picture. The decoded difference picture is added to the decoded prediction picture to provide the decoded picture to be output to a display. The decoded picture is employed as the reference picture at the decoder side in the subsequent frame.

In any process of the system, a concerned picture or part thereof is always mapped in an imaginary picture frame as an overwritable white canvas so that any pixel position is defined in a common coordinate system.

FIG. 1 is a block diagram of a conventional motion picture coding and decoding system.

The conventional system comprises an encoder, a decoder and a transmission line provided therebetween.

In the encoder, a motion detector 301 refers to a local decoded picture D401 (i.e. reference picture) of a previous frame, for detecting inter-frame motions in an input picture PI relative thereto to output a set of motion data D402. A motion-compensated inter-frame prediction circuit 302 is responsible for the motion data D402 to employ the local decoded picture D401 for generating therefrom to output a set of motion-compensated inter-frame prediction data D403 (i.e. prediction picture).

For the motion-compensated inter-frame prediciton, there is employed a typical process in which the input picture PI is divided into blocks of a predetermined size to be sequentially processed. According to international standard coding systems such as ITU-T/H.261 or ISO-IEC 11172-2 (MPEG-1) and 13818-2 (MPEG-2), an input picture is divided into blocks of a size of 16 pixels by 16 lines as a unit region to be processed for motion-compensated inter-frame prediction. The input picture PI may be divided into segments of an arbitrary predetermined size to be sequentially processed.

In the encoder of FIG. 1, a difference calculator or subtractor 303 calculates a difference between the input picture PI and the motion-compensated inter-frame prediction data D403, to output a set of difference data (i.e. difference picture). An orthogonal transformation circuit 304 makes an orthogonal transformation of the difference data to output a set of orthogonally transformed data. A quantization circuit 305 makes a quantization of the orthogonally transformed data to output a set of quantized data D404 (i.e. compressed data).

Moreover, in the encoder, an inverse quantization circuit 306 makes an inverse-quantization of the quantized data D404 to output a set of inverse-quantized data. An inverse orthogonal transformation circuit 307 makes an inverse orthogonal transformation of the inverse-quantized data to output a set of inverse-orthogonally transformed data (i.e. local decoded difference picture). An adder 308 makes an addition of the inverse-orthogonally transformed data and the motion-compensated inter-frame prediction data D403 to output a local decoded picture D405 (of a current frame) to a memory 309, where it is stored as a set of data to be employed in a subsequent frame as the local decoded picture D401 (of a previous frame) for reference use in an encoding of an input picture.

Further, in the encoder, a coding circuit 310 converts the motion data D402 and the quantized data D404 into a bitstream D406 as a coded picture PC to be supplied via the transmission line to the decoder.

In the decoder, the bitstream D406 supplied from the encoder is inverse-converted by a decoding circuit 311 into a set of motion data D407 (i.e. decoded motion data) and a set of quantized data D408 (i.e. decoded compressed data). An inverse quantization circuit 312 makes an inverse quantization of the quantized data D408 to output a set of inverse-quantized data. An inverse orthogonal transformation circuit 313 makes an inverse orthogonal transformation of the inverse-quantized data to output a set of inverse-orthogonally transformed data (i.e. decoded difference picture).

Moreover, in the decoder, a motion-compensated inter-frame prediction circuit 314 employs the motion data D407 and a decoded picture D409 of the previous frame to generate therefrom to output a set of motion-compensated inter-frame prediction data D410 (i.e. decoded prediction picture). An adder 315 makes an addition of the motion-compensated inter-frame prediction data D410 and the inverse-orthogonally transformed data to provide a set of resultant data D411 as a decoded picture PD (of the current frame) to be externally output.

The decoded picture PD is input to a memory 316, where it is stored as a set of data to be employed in the subsequent frame as the decoded picture D409 (of the previous frame) for reference use in a decoding of a coded picture.

In the conventional system described, an entirety of a decoded or local decoded picture as a reference picture stored in a memory is referred to for a block-level motion-compensated inter-frame prediction of an input picture, without considerations to a composition or configuration of a picked-up image of an object that may extend over two or more blocks of a predetermined size.

Therefore, at either or both of encoder and decoder sides, when a concerned region consisting of one or more blocks is decoded in a current frame, if the remaining region is not decoded, then the decoded region is seldom self-completed with respect to information on individual images therein, as some of them should have been partially associated with the remaining region. Accordingly, in a subsequent frame, a reference picture fails to provide a complete set of necessary data for a motion-compensated inter-frame prediction.

When this reference picture is referred to (at a motion detector and a prediction circuit in an encoder and/or a prediction circuit in a decoder), the incompleteness of data is succeeded in a set of resultant data, causing a distortion of each associated image in a local decoded picture and/or a decoded picture.

As like process is repeated every new frame, such a distortion will be accumulated, resulting in a failure to code and/or decode a significant picture.

To avoid such a failure, the conventional system needs encoding and decoding an entirety of an input picture.

To overcome such a deficiency, there has been proposed a picture selection method in the Japanese Patent Application Laid-Open Publication No. 4-186986, in which a television conference system receives a pair of separately supplied input pictures, one picture representing a continuous image of a still background and the other picture representing an intermittent image of a concerned person put on a continuous image of a mono-tone background, and selects either picture with a priority to a detection of the person image, before encoding the selected picture.

This conventional system however needs a pair of cameras employed either for picking up the still background and the other for picking up the mono-tone background in front of which the concerned person sometimes comes on. Still less, the person cannot appear in the still background.

To this point, there has been proposed a characteristic-adaptive split method in the Japanese Patent Application Laid-Open Publication No. 3-133290, in which a static picture coding system splits an input picture into a plurality of split regions each configured in an adaptive manner to a static characteristic (e.g. tone-level, luminance or frequency) of the picture itself and processes every split region for a compression coding such that a coded picture consists of compressed split data and compressed pixel data, thus permitting a heading monitoring of a selected split region.

This conventional system, however, is unavailable for any application to a motion picture, because it provides no motion data.

In this respect, there has been proposed a motion picture adaptive coding method in the Japanese Patent Application Laid-Open Publication No. 1-228384, in which a motion picture coding system selects a quantization parameter that represents a preferable unity of a quantization of a difference picture in dependence on a pixel data of a difference picture and on a result of an undefined adaptive splitting of a local decoded picture or of a motion-adaptive splitting of a motion-compensated inter-frame prediction picture, whereas a local decoding of compressed data is independent of the result of splitting so that a result of the local decoding is subjected to a filtering depending on the split result to obtain the local decoded picture, and no split data is transmitted to a decoder, where like decoding to the local decoding may be effected.

Therefore, this conventional system has a reduced quantity of compressed data with a penalty of a reduced image quality. Still less, notwithstanding a perception of an adaptive splitting of a predicted or referenced motion picture, it is difficult for this system to permit a coding or decoding of a selected motion image.

The present invention has been achieved with such points in mind.

SUMMARY OF THE INVENTION

It is therefore an object of the present invention to provide a system and a method for coding and/or decoding a selectable one of image-adaptive split regions of a motion picture, permitting a reproduction of the selected split region with a significant configuration.

To achieve the object, a genus of the present invention provides a motion picture coding system for coding a motion picture, the system comprising a first means for providing a current image defined by a concerned region and a set of pixel data of addressed pixels thereon, and an identifying data set for identifying the concerned region in an entire region of the motion picture, a second means responsible for the identifying data set to provide a reference image representative of a previous image of the current image in a current frame, a third means for detecting a motion the reference image has made to constitute the current image, a fourth means responsible for the detected motion to motion-compensate the reference image to generate a prediction image of the current image, a fifth means for generating a difference image between the current image and the prediction image, a sixth means for detecting a configuration of the concerned region, and a seventh means for coding the detected configuration, the detected motion, the difference image and the identifying data set, in a compressing manner to output a symbol sequence.

According to a species of this genus of the invention, the seventh means includes a conversion means for converting the difference image into a set of compressed data, and the system further comprises an eighth means for inverse-converting the set of compressed data to provide a local decoded image of the difference image, a ninth means for adding the local decoded image of the difference image to the prediction image to provide a local decoded image of the current image, a tenth means for correcting a configuration of the local decoded image of the current image in accordance with the detected configuration of the concerned region to provide a corrected image of the local decoded image of the current image, and an eleventh means responsible for the identifying data set to store the corrected image in an identifiable manner to be read as the reference image in a subsequent frame of the current frame.

According to another species of this genus of the invention, the first means comprises a picture splitting means responsible for a reference picture representative of a previous picture of the motion picture to split the motion picture into a plurality of identifiable images significantly correlated with a plurality of identified images of the reference picture so that the current image comprises one or more of the plurality of identifiable images, and a selector means for sequenctially selecting the one or more identifiable images to provide the current image and for providing the identification data set.

According to another species of this genus of the invention, the concerned region comprises a first split region and a second split region so that the current image is composed of a first identifiable image on the first split region and a second identifiable image on the second split region, the identifying data set comprises an identification data for identifying the concerned region in the entire region of the motion picture, a first identification number for identifying the first split region of the concerned region, and a second identification number for identifying the second split region of the concerned region, the first means sequentially selects to provide the first and second identifiable images so that a preceding one of the first and second identification numbers has a precedence of selection to the other, and the second means is responsive to a combination of the identification data and the first and second identification numbers for sequentially selecting to provide those of a pluality of divided images of the reference image corresponding to the first and second identifiable images.

According to another species of this genus of the invention, the first means provides a combination of first said current image defined by first said concerned region and first said set of pixel data of addressed pixels thereon and second said current image defined by second said concerned region and second said set of pixel data of addressed pixels thereon, and the identifying data set comprises an identification data for identifying the combination of said first and second concerned regions in the entire region of the motion picture, a first identification-number for identifying said first concerned region in the combination of said first and second concerned regions, a second identification number for identifying said second concerned region in the combination of said first and second concerned regions, and a composition data for defining an overlap precedence between an arbitrary one of the addressed pixels on said first concerned region and a corresponding one of the addressed pixels on said second concerned region.

To achieve the object, another genus of the invention provides a motion picture decoding system for decoding a symbol sequence representing a detected configuration of a concerned region identified in an entire region of a motion picture, a detected motion between a current image defined by a combination of the concerned region and a set of pixel data of addressed pixels thereon and a reference image representative of a previous image of the current image in a current frame, and a difference image between the current image and a prediction image thereof generated by motion-compensating the reference image with the detected motion, the system comprising a first means for decoding the symbol sequence to provide a decoded configuration representing the detected configuration, a decoded motoin representing the detected motion, and a decoded image of the difference image, a second means responsible for the decoded motion to motion-compensate a representative image of the reference image in the current frame to generate a decoded image of the prediction image, a third means for adding the decoded image of the difference image to the decoded image of the prediction image to provide a decoded image of the current image, and a fourth means for correcting a configuration of the decoded image of the current image in accordance with the decoded configuration to provide a corrected image of the decoded image of the current iamge.

According to a species of this genus of the invention, the symbol sequence further represents an identifying data set for identifying the concerned region in an entire region of the motion picture, the first means decodes the symbol sequence so that the identifying data set is decoded as a data set, and the system further comprises a fifth means responsible for the decoded data set to store the corrected image in an identifiable manner to be read as the representative image in a subsequent frame of the current frame.

According to an individual of this species of the invention, the concerned region comprises a first split region and a second split region so that the current image is composed of a first identifiable image on the first split region and a second identifiable image on the second split region, the identifying data set comprises an identification data for identifying the concerned region in the entire region of the motion picture, a first identification number for identifying the first split region of the concerned region, and a second identification number for identifying the second split region of the concerned region, the first and second identifiable images are sequentially provided so that a preceding one of the first and second identification numbers has a precedence of selection to the other, the decoded data set includes data representing the identification data, the first and second identification numbers and the precedence of selection, the corrected image comprises a first corrected image representing the first identifiable image and a second corrected image representing the second identifiable image, and the fifth means responds to the decoded data set so that the first and second corrected images are sequentially stored in the identifiable manner.

To achieve the object, another genus of the invention provides a motion picture coding and decoding system for coding and decoding a motion picture, the system comprising a first means for providing a current image defined by a concerned region and a set of pixel data of addressed pixels thereon, and an identifying data set for identifying the concerned region in an entire region of the motion picture, a second means responsible for the identifying data set to provide a reference image representative of a previous image of the current image in a current frame, a third means for detecting a motion the reference image has made to constitute the current image, a fourth-means responsible for the detected motion to motion-compensate the reference image to generate a prediction image of the current image, a fifth means for generating a difference image between the current image and the prediction image, a sixth means for detecting a configuration of the concerned region, a seventh means for coding the detected configuration, the detected motion, the difference image and the identifying data set, in a compressing manner to output a symbol sequence, an eighth means for decoding the symbol sequence to provide a decoded data set representing the identification data set, a decoded motion representing the detected motion, a decoded configuration representing the detected configuration, and a decoded image of the difference image, a ninth means responsible for the decoded motion to motion-compensate a representative image of the reference image in the current frame to generate a decoded image of the prediction image, a tenth means for adding the decoded image of the difference image to the decoded image of the prediction image to provide a decoded image of the current image, an eleventh means for correcting a configuration of the decoded image of the current image in accordance with the decoded configuration to provide a corrected image of the decoded image of the current iamge, and a twelfth means responsible for the decoded data set to store the corrected image in an identifiable manner to be read as the representative image in the subsequent frame.

According to a species of this genus of the invention, the first means provides a combination of first said current image defined by first said concerned region and first said set of pixel data of addressed pixels thereon and second said current image defined by second said concerned region and second said set of pixel data of addressed pixels thereon, the identifying data set comprises an identification data for identifying the combination of said first and second concerned regions in the entire region of the motion picture, a first identification number for identifying said first concerned region in the combination of said first and second concerned regions, a second identification number for identifying said second concerned region in the combination of said first and second concerned regions, and a composition data for defining an overlap precedence between an arbitrary one of the addressed pixels on said first concerned region and a corresponding one of the addressed pixels on said second concerned region, the decoded data set includes data representing the identification data, the first and second identification numbers and the composition data, the corrected image of the decoded image comprises a first decoded image representing said first current image and a second decoded image representing said second current image, and the system further comprises a thirteenth means responsible for the decoded data set to synthesize the first and second corrected images in accordance with the data representing the composition data.

Further, to achieve the object, another genus of the invention provides a motion picture coding method for coding a motion picture, the method comprising a first step of providing a current image defined by a concerned region and a set of pixel data of addressed pixels thereon, and an identifying data set for identifying the concerned region in an entire region of the motion picture, a second step of responding to the identifying data set to provide a reference image representative of a previous image of the current image in a current frame, a third step of detecting a motion the reference image has made to constitute the current image, a fourth step of responding to the detected motion to motion-compensate the reference image to generate a prediction image of the current image, a fifth step of generating a difference image between the current image and the prediction image, a sixth step of detecting a configuration of the concerned region, and a seventh step of coding the detected configuration, the detected motion, the difference image and the identifying data set, in a compressing manner to output a symbol sequence.

According to a species of this genus of the invention, the seventh step includes converting the difference image into a set of compressed data, and the method further comprises an eighth step of inverse-converting the the set of compressed data to provide a local decoded image of the difference image, a ninth step of adding the local decoded image of the difference image to the prediction image to provide a local decoded image of the current image, a tenth step of correcting a configuration of the local decoded image of the current image in accordance with the detected configuration of the concerned region to provide a corrected image of the local decoded image of the current image, and an eleventh step of respondoing to the identifying data set to store the corrected image in an identifiable manner to be read as the reference image in a subsequent frame of the current frame.

According to another species of this genus of the invention, the first step comprises responding to a reference picture representative of a previous picture of the motion picture to split the motion picture into a plurality of identifiable images significantly correlated with a plurality of identified images of the reference picture so that the current image comprises one or more of the plurality of identifiable images, and sequenctially selecting the one or more identifiable images to provide the current image and for providing the identification data set.

According to another species of this genus of the invention, the concerned region comprises a first split region and a second split region so that the current image is composed of a first identifiable image on the first split region and a second identifiable image on the second split region, the identifying data set comprises an identification data for identifying the concerned region in the entire region of the motion picture, a first identification number for identifying the first split region of the concerned region, and a second identification number for identifying the second split region of the concerned region, the first step includes sequentially selecting to provide the first and second identifiable images so that a preceding one of the first and second identification numbers has a precedence of selection to the other, and the second step includes responding to a combination of the identification data and the first and second identification numbers for sequentially selecting to provide those of a pluality of divided images of the reference image corresponding to the first and second identifiable images.

According to another species of this genus of the invention, the first step includes providing a combination of first said current image defined by first said concerned region and first said set of pixel data of addressed pixels thereon and second said current image defined by second said concerned region and second said set of pixel data of addressed pixels thereon, and the identifying data set comprises an identification data for identifying the combination of said first and second concerned regions in the entire region of the motion picture, a first identification number for identifying said first concerned region in the combination of said first and second concerned regions, a second identification number for identifying said second concerned region in the combination of said first and second concerned regions, and a composition data for defining an overlap precedence between an arbitrary one of the addressed pixels on said first concerned region and a corresponding one of the addressed pixels on said second concerned region.

To achieve the object, another genus of the invention provides a motion picture decoding method for decoding a symbol sequence representing a detected configuration of a concerned region identified in an entire region of a motion picture, a detected motion between a current image defined by a combination of the concerned region and a set of pixel data of addressed pixels thereon and a reference image representative of a previous image of the current image in a current frame, and a difference image between the current image and a prediction image thereof generated by motion-compensating the reference image with the detected motion, the mehtod comprising a first step of decoding the symbol sequence to provide a decoded configuration representing the detected configuration, a decoded motoin representing the detected motion, and a decoded image of the difference image, a second step of responding to the decoded motion to motion-compensate a representative image of the reference image in the current frame to generate a decoded image of the prediction image, a third step of adding the decoded image of the difference image to the decoded image of the prediction image to provide a decoded image of the current image, and a fourth step of correcting a configuration of the decoded image of the current image in accordance with the decoded configuration to provide a corrected image of the decoded image of the current iamge.

According to a species of this genus of the invention, the symbol sequence further represents an identifying data set for identifying the concerned region in an entire region of the motion picture, the first step includes decoding the symbol sequence so that the identifying data set is decoded as a data set, and the method further comprises a fifth step of responding to the decoded data set to store the corrected image in an identifiable manner to be read as the representative image in a subsequent frame of the current frame.

According to an individual of this species of the invention, the concerned region comprises a first split region and a second split region so that the current image is composed of a first identifiable image on the first split region and a second identifiable image on the second split region, the identifying data set comprises an identification data for identifying the concerned region in the entire region of the motion picture, a first identification number for identifying the first split region of the concerned region, and a second identification number for identifying the second split region of the concerned region, the first and second identifiable images are sequentially provided so that a preceding one of the first and second identification numbers has a precedence of selection to the other, the decoded data set includes data representing the identification data, the first and second identification numbers and the precedence of selection, the corrected image comprises a first corrected image representing the first identifiable image and a second corrected image representing the second identifiable image, and the fifth step includes responding to the decoded data set so that the first and second corrected images are sequentially stored in the identifiable manner.

To achieve the object, another genus of the invention provides a motion picture coding and decoding method for coding and decoding a motion picture, the method comprising a first step of providing a current image defined by a concerned region and a set of pixel data of addressed pixels thereon, and an identifying data set for identifying the concerned region in an entire region of the motion picture, a second setp of responding to the identifying data set to provide a reference image representative of a previous image of the current image in a current frame, a third step of detecting a motion the reference image has made to constitute the current image, a fourth step of responding to the detected motion to motion-compensate the reference image to generate a prediction image of the current image, a fifth step of generating a difference image between the current image and the prediction image, a sixth setp of detecting a configuration of the concerned region, a seventh setp of coding the detected configuration, the detected motion, the difference image and the identifying data set, in a compressing manner to output a symbol sequence, an eighth setp of decoding the symbol sequence to provide a decoded data set representing the identification data set, a decoded motion representing the detected motion, a decoded configuration representing the detected configuration, and a decoded image of the difference image, a ninth setp of responding to the decoded motion to motion-compensate a representative image of the reference image in the current frame to generate a decoded image of the prediction image, a tenth step of adding the decoded image of the difference image to the decoded image of the prediction image to provide a decoded image of the current image, an eleventh setp of correcting a configuration of the decoded image of the current image in accordance with the decoded configuration to provide a corrected image of the decoded image of the current iamge, and a twelfth step of responding to the decoded data set to store the corrected image in an identifiable manner to be read as the representative image in the subsequent frame.

According to a species of this genus of the invention, the first step includes providing a combination of first said current image defined by first said concerned region and first said set of pixel data of addressed pixels thereon and second said current image defined by second said concerned region and second said set of pixel data of addressed pixels thereon, the identifying data set comprises an identification data for identifying the combination of said first and second concerned regions in the entire region of the motion picture, a first identification number for identifying said first concerned region in the combination of said first and second concerned regions, a second identification number for identifying said second concerned region in the combination of said first and second concerned regions, and a composition data for defining an overlap precedence between an arbitrary one of the addressed pixels on said first concerned region and a corresponding one of the addressed pixels on said second concerned region, the decoded data set includes data representing the identification data, the first and second identification numbers and the composition data, the corrected image of the decoded image comprises a first decoded image representing said first current image and a second decoded image representing said second current image, and the method further comprises a thirteenth step of responding to the decoded data set to synthesize the first and second corrected images in accordance with the data representing the composition data.

Still more, to achieve the object, another genus of the present invention provides a motion picture coding system comprising a means for referring to a local decoded picture data of a previous frame for splitting an input picture into a plurality of regions and outputting the same, a means for selecting to output the split input picture data by the regions and outputting a precedence data for identifying the selected region, a means for detecting to output a configuration data of the region, a means for referring to an input picture data of the region and a local decoded picture data of the previous frame in the region to detect to output an inter-frame motion data of the region, a means responsible for the motion data to generate from the decoded picture data a motion-compensated inter-frame prediction data and outputting the same, a means for calculating to output a difference data between the input picture data and the motion-compensated inter-frame prediction data, a means for orthogonally transforming the difference data to output the orthogonally transformed data, a means for quantizing the orthogonally transformed data to output the quantized data, a means for inverse-quantizing the quantized data to output the inverse-quantized data, a means for inverse-orthogonally transforming the inverse-quantized data to output the inverse-orthogonally transformed data, an addition means for performing an addition of the inverse-orthogonally transformed data and the motion-compensated inter-frame prediction data to output a local decoded picture data of the region, a configuration correction means for responding to the configuration data to correct a configuration of the local decoded picture data and outputting the configuration-corrected local decoded picture data, a memory means responsible for the precedence data to store therein the configuration-corrected local decoded picture data by the regions and to output as a referernce data for a coding of the region in a subsequent frame, and a means for coding the precedence data, the configuration data, the motion data and the quantized data to output the coded data.

According to a species of this genus of the invention, the motion picture coding system further comprises a picture data correction means for responding to the configuration data by the regions to separate the difference data between the input picture data and the motion-compensated inter-frame prediction data into an effective region and an ineffective region and to interpolate a dummy data over the ineffective region to output the same.

According to another species of this genus of the invention, the motion picture coding system further comprises a vector quantizing means for vector-quantizing to output the configuration data by the regions, and an inverse vector quantizing means for inverse vector-quantizing the vector-quantized configuration data and supplying the inverse vector-quantized data to the means for correcting the configuration of the local decoded picture data.

To achieve the object, another genus of the invention provides a motion picture decoding system comprising a means for decoding a coded data of a picture data of a motion picture, as it is split to be coded by regions, into a precedence data for identifying the region, a configuration data, a motion data and a quantized data to output the decoded data by the regions, a means for inverse-quantizing the quantized data to output the inverse quantized data, a means for inverse-orthogonally transforming the inverse-quantized data to output the inverse-orthogonally transformed data, a means responsible for the motion data to generate, from a decoded picture data of a concerned region decoded in a previous frame, a motion-compensated inter-frame prediction data and outputting the same, a means for performing an addition of the inverse-orthogonally transformed data and the motion-compensated inter-frame prediction data to output a decoded picture data by the regions, a means for responding to the configuration data to correct a configuration of the decoded picture data and outputting the configuration-corrected decoded picture data, a means responsible for the precedence data to store therein the configuration-corrected decoded picture data by the regions and to output as a referernce data for a decoding of the region in a subsequent frame, and a means responsible for the precedence data to synthesize a plurality of decoded picture data by the regions, as they are configuration-corrected, and to output the synthesized decoded picture.

To achieve the object, another genus of the invention provides a motion picture coding system comprising a means for referring to a local decoded picture data of a previous frame for splitting an input picture into a plurality of regions and outputting the same, a means for selecting to output the split input picture data by the regions and outputting a precedence data for identifying the selected region, a means for outputting a configuration data of the region, a means for referring to an input picture data of the region and a local decoded picture data of the previous frame in the region to detect to output an inter-frame motion data of the region, a means responsible for the motion data to generate from the decoded picture data a motion-compensated inter-frame prediction data and outputting the same, a means for calculating to output a difference data between the input picture data and the motion-compensated inter-frame prediction data, a transform base generating means responsible for the configuration data to generate to output an orthogonal transform base of an arbitrary configuration, a means responsible for the orthogonal transform base to orthogonally transform the difference data to output the orthogonally transformed data, a means for quantizing the orthogonally transformed data to output the quantized data, a means for inverse-quantizing the quantized data to output the inverse-quantized data, a means responsible for the orthogonal transform base to inverse-orthogonally transform the inverse-quantized data to output the inverse-orthogonally transformed data, an addition means for performing an addition of the inverse-orthogonally transformed data and the motion-compensated inter-frame prediction data to output a local decoded picture data of the region, a memory means responsible for the precedence data to store therein the local decoded picture data by the regions and to output as a referernce data for a coding of the region in a subsequent frame, and a means for coding the precedence data, the configuration data, the motion data and the quantized data to output the coded data.

To achieve the object, another genus of the invention provides a motion picture decoding system comprising a means for decoding a coded data of a picture data of a motion picture, as it is split to be coded by regions, into a precedence data for identifying the region, a configuration data, a motion data and a quantized data to output the decoded data by the regions, a means responsible for the configuration data to generate to output an orthogonal transform base of an arbitrary configuration, a means for inverse-quantizing the quantized data to output the inverse quantized data, a means responsible for the orthogonal transform base to inverse-orthogonally transform the inverse-quantized data to output the inverse-orthogonally transformed data, a means responsible for the motion data to generate, from a decoded picture data of a concerned region decoded in a previous frame, a motion-compensated inter-frame prediction data and outputting the same, a means for performing an addition of the inverse-orthogonally transformed data and the motion-compensated inter-frame prediction data to output a decoded picture data by the regions, a means responsible for the precedence data to store therein the decoded picture data by the regions and to output as a referernce data for a decoding of the region in a subsequent frame, and a means responsible for the precedence data to synthesize a plurality of decoded picture data by the regions, as they are configuration-corrected, and to output the synthesized decoded picture.

Yet more, to achieve the object described, another genus of the invention provides a motion picture coding method comprising the steps of referring to a local decoded picture data of a previous frame for splitting an input picture into a plurality of regions and outputting the same, selecting to output the split input picture data by the regions and outputting a precedence data for identifying the selected region, detecting to output a configuration data of the region, referring to an input picture data of the region and a local decoded picture data of the previous frame in the region to detect to output an inter-frame motion data of the region, being responsible for the motion data to generate from the decoded picture data a motion-compensated inter-frame prediction data and outputting the same, calculating to output a difference data between the input picture data and the motion-compensated inter-frame prediction data, orthogonally transforming the difference data to output the orthogonally transformed data, quantizing the orthogonally transformed data to output the quantized data, inverse-quantizing the quantized data to output the inverse-quantized data, inverse-orthogonally transforming the inverse-quantized data to output the inverse-orthogonally transformed data, performing an addition of the inverse-orthogonally transformed data and the motion-compensated inter-frame prediction data to output a local decoded picture data of the region, responding to the configuration data to correct a configuration of the local decoded picture data and outputting the configuration-corrected local decoded picture data, being responsible for the precedence data to store therein the configuration-corrected local decoded picture data by the regions and to output as a referernce data for a coding of the region in a subsequent frame, and coding the precedence data, the configuration data, the motion data and the quantized data to output the coded data.

According to a species of this genus of the invention, the motion picture coding method further comprises responding to the configuration data by the regions to separate the difference data between the input picture data and the motion-compensated inter-frame prediction data into an effective region and an ineffective region and to interpolate a dummy data over the ineffective region to output the same.

According to another species of this genus of the invention, the motion picture coding method further comprises the steps of vector-quantizing to output the configuration data by the regions, and inverse vector-quantizing the vector-quantized configuration data and supplying the inverse vector-quantized data to the means for correcting the configuration of the local decoded picture data.

To achieve the object described, another genus of the invention provides a motion picture coding method comprising the steps of decoding a coded data of a picture data of a motion picture, as it is split to be coded by regions, into a precedence data for identifying the region, a configuration data, a motion data and a quantized data to output the decoded data by the regions, inverse-quantizing the quantized data to output the inverse quantized data, inverse-orthogonally transforming the inverse-quantized data to output the inverse-orthogonally transformed data, being responsible for the motion data to generate, from a decoded picture data of a concerned region decoded in a previous frame, a motion-compensated inter-frame prediction data and outputting the same, performing an addition of the inverse-orthogonally transformed data and the motion-compensated inter-frame prediction data to output a decoded picture data by the regions, being responding to the configuration data to correct a configuration of the decoded picture data and outputting the configuration-corrected decoded picture data, being responsible for the precedence data to store therein the configuration-corrected decoded picture data by the regions and to output as a referernce data for a decoding of the region in a subsequent frame, and being responsible for the precedence data to synthesize a plurality of decoded picture data by the regions, as they are configuration-corrected, and to output the synthesized decoded picture.

To achieve the object described, another genus of the invention provides a motion picture coding method comprising the steps of referring to a local decoded picture data of a previous frame for splitting an input picture into a plurality of regions and outputting the same, selecting to output the split input picture data by the regions and outputting a precedence data for identifying the selected region, outputting a configuration data of the region, referring to an input picture data of the region and a local decoded picture data of the previous frame in the region to detect to output an inter-frame motion data of the region, being responsible for the motion data to generate from the decoded picture data a motion-compensated inter-frame prediction data and outputting the same, calculating to output a difference data between the input picture data and the motion-compensated inter-frame prediction data, being responsible for the configuration data to generate to output an orthogonal transform base of an arbitrary configuration, being responsible for the orthogonal transform base to orthogonally transform the difference data to output the orthogonally transformed data, quantizing the orthogonally transformed data to output the quantized data, inverse-quantizing the quantized data to output the inverse-quantized data, being responsible for the orthogonal transform base to inverse-orthogonally transform the inverse-quantized data to output the inverse-orthogonally transformed data, performing an addition of the inverse-orthogonally transformed data and the motion-compensated inter-frame prediction data to output a local decoded picture data of the region, being responsible for the precedence data to store therein the local decoded picture data by the regions and to output as a referernce data for a coding of the region in a subsequent frame, and coding the precedence data, the configuration data, the motion data and the quantized data to output the coded data.

To achieve the object described, another genus of the invention provides a motion picture coding method comprising the steps of decoding a coded data of a picture data of a motion picture, as it is split to be coded by regions, into a precedence data for identifying the region, a configuration data, a motion data and a quantized data to output the decoded data by the regions, being responsible for the configuration data to generate to output an orthogonal transform base of an arbitrary configuration, inverse-quantizing the quantized data to output the inverse quantized data, being responsible for the orthogonal transform base to inverse-orthogonally transform the inverse-quantized data to output the inverse-orthogonally transformed data, being responsible for the motion data to generate, from a decoded picture data of a concerned region decoded in a previous frame, a motion-compensated inter-frame prediction data and outputting the same, performing an addition of the inverse-orthogonally transformed data and the motion-compensated inter-frame prediction data to output a decoded picture data by the regions, being responsible for the precedence data to store therein the decoded picture data by the regions and to output as a referernce data for a decoding of the region in a subsequent frame, and being responsible for the precedence data to synthesize a plurality of decoded picture data by the regions, as they are configuration-corrected, and to output the synthesized decoded picture.

Therefore, according to the present invention, in a coding system, an input picture is split into regions with adaptive configurations to a reference picture, a selected region with precedence data is detected of its configuration and of its relative motion to a corresponding region of the reference picture, a prediction region is generated from the corresponding region of the reference picture and the relative motion, a difference region is determined between the selected region and the prediction region, and the precedence data, detected configuration, relative motion and difference ergion are coded. And, in a decoding system, a decoded prediction region is generated from a decoded relative motion and a corresponding region of a reference picture selected by a decoded precedence data, and a decoded difference region is added to the decoded prediction region to obtain a decoded picture region, which is configuration-corrected by a decoded configuratrion data, before synthesizing a plurality of decoded picture regions to obtain a synthesized picture region.

Accordingly, a reproduction of a selected split region is permitted to be achieved with a significant configuration.

BRIEF DESCRIPTION OF THE DRAWINGS

The objects, features and advantages of the present invention will become more apparent from consideration of the following detailed description, taken in conjunction with the accompanying drawings, in which:

FIG. 16 is an illustration for describing a composition data according to the invention.

DETAILED DESCRIPTION OF THE PREFERRED EMBODIMENTS

Figure 1:
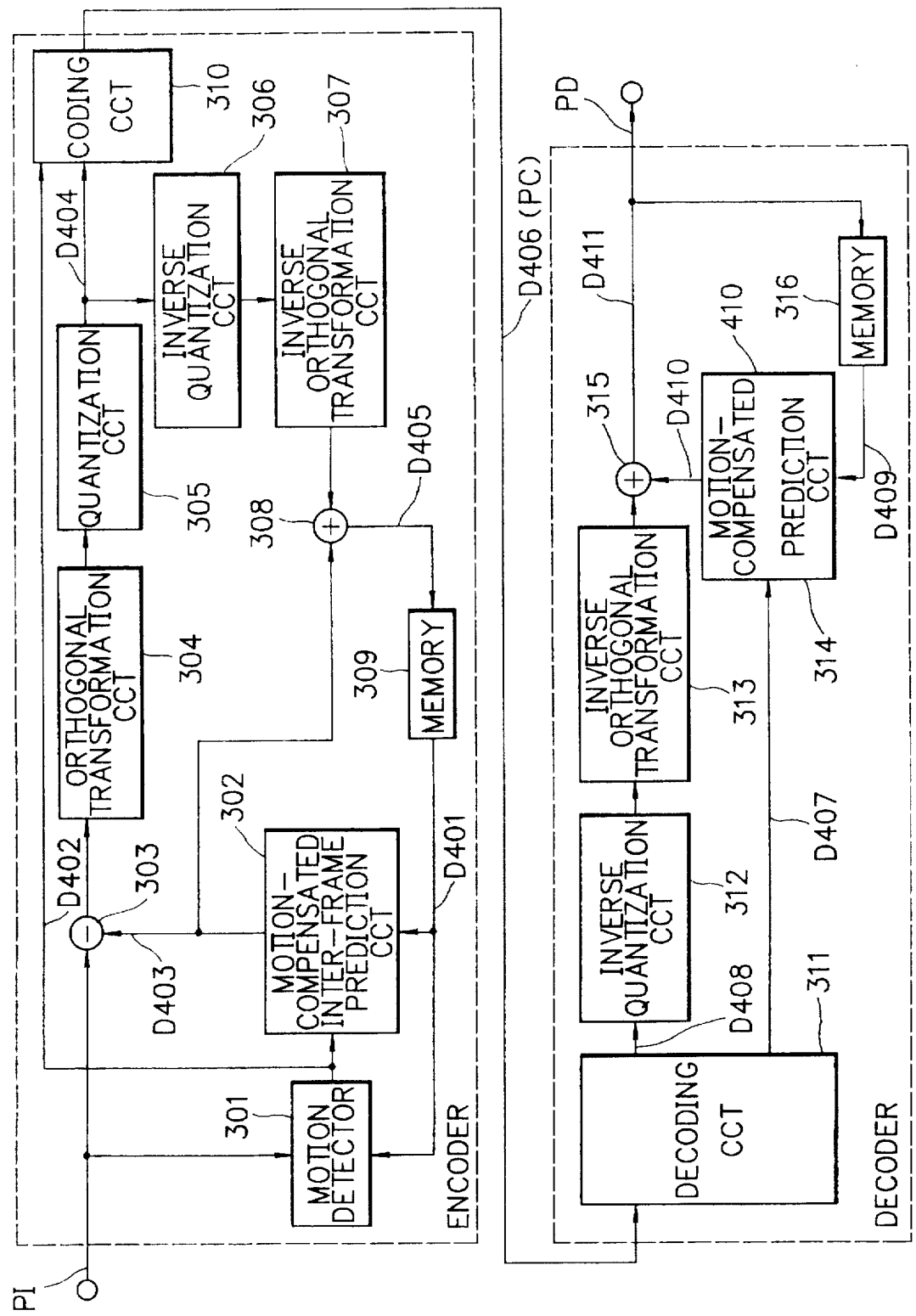
FIG. 1 is a block diagram of a conventional motion picture coding and decoding system.

There will be detailed below preferred embodiments of the present invention, with reference to the accompanying drawings. Like members are designated by like reference characters.

It is first assumed that in any embodiment each active circuit has therein an unshown microcomputer and necessary memories and/or registers for executing an associated process and/or is connected to an unshown common or central processing unit and hence may be implemented in a form a program file.

It is further assumed that a reference picture (PR) in a coding system, a difference picture (Pd), a prediction picture (PP), a coded picture (PC), a local decoded picture (PL), a configuration-corrected local-decoded picture (PLC), a decoded difference picture (PdD), a decoded prediction picture (PPD), a reference picture (PRD) in a decoding system, a decoded picture (PD), a configuration-corrected decoded picture (PDC) and a synthesized picture (PS) are referred to, as their split regions are all mapped in an imaginary picture frame, respectively.

Figure 2:
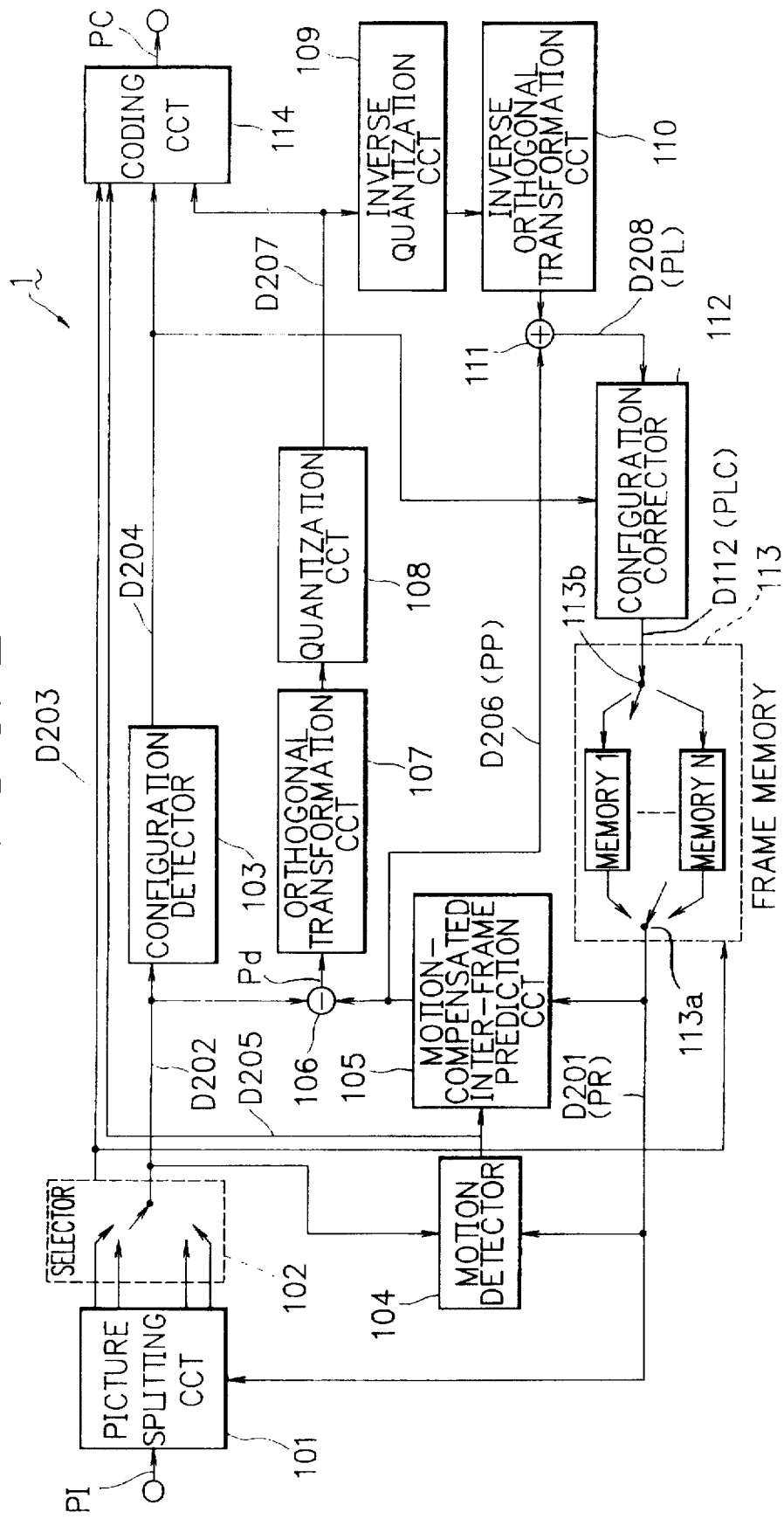
FIG. 2 is a block diagram of a motion picture coding system according to a first embodiment of invention.

FIG. 2 shows a motion picture coding system according to a first embodiment of the invention.

In FIG. 2, designated at reference character 1 is the coding system according to the first embodiment. The system 1 includes a picture splitting circuit 101 for splitting an input picture PI as a matrix of pixel data into a variable number of split regions shaped in a later-described adaptive manner, a region selector 102 for selecting one of the split regions to output a combination of the selected region as an identified set of pixel data D202 having their pixel positions defined and a precedence data D203 representing a relationship between an order of the selection and an identification number of the selected region, a configuration detector 103 for detecting a contour shape of the selected region D202, as it is input thereto in accordance with the order of selection by the selector 102, and a frame memory 113 composed of a total of N serially numbered memories for individually storing therein a total of at most N identified split regions D201 of a configuration-corrected local-decoded picture PLC, where N is a predetermined positive integer larger than one.

The picture splitting circuit 101 refers to the configuration-corrected local-decoded picture PLC as a reference picture PR, when splitting the input picture PI.

More specifically, when a current picture PI is input, the splitting circuit 101 receives a first-identified one of the split regions D201 of the reference picture PR from a memory-1 of the frame memory 113, as it is selected by an output selector 113a of the frame memory 113, scans a probable area of the input picture PI within a calculated norm distance range relative to the received region D201 to detect an image region having a significant inter-frame correlation with the region D201, and acknowledges the correlative image region as a first-identified split region of the input picture PI so that each pixel data therein is provided with an identical identification number to the received region D201 and a pixel position of each acknowledged pixel data in the input picture PI has an acknowledgment flag set therefor.

The significancy of inter-frame correlation between an image region of the input picture PI and the received region of the locaL decoded picture PL may be decided in terms of a similarity therebetween with respect to a characteristic of pixel data such as a luminance or chromaticity or to a relative motion of each pixel therein, as the image region is recognized as a set of pixels similar to each other in such a characteristic or motion. Accordingly, the acknowledged split region has an adaptive configuration to the received split region or to a characteristic or relative motion of the reference picture PR.

Then, the splitting circuit 101 receives a second-identified one of the split regions D201 of the reference picture PR from a memory-2, scans a probable area of the input picture PI within a calculated norm distance range excluding every pixel postiion that has the acknowledgment flag set therefor and acknowledges a correlative image region as a second-identified split region of the input picture PI.

Likewise, the circuit 101 sequentially receives every identified one of the split regions D201 of the reference picture PR from the memory 113, each time scans a probable area of the input picture PI, and concurrently acknowledges a correlative image region as an identified split region of the input picture PI.

Upon a reception of an identified split region D201 of the reference picture PR, if no significant correlation is found in a probable area of the input picture PI, a corresponding identification number is reserved for a later use.

After such responses to identified split regions D201 of the reference picture PR, the circuit 101 checks the input picture PI for pixels having no acknowledgment flags set therefor, and acknowledges each colony of such pixels as a split region to be identified by one of available identification numbers, providing that the colony is larger in population than a criterion and pixels therein neighbor each other.

Thereafter, every colony having a population not exceeding the criterion as well as each scattered pixel without acknowledgment flag set therefor is acknowledged to be identified as a fraction or element of a most correlative one or a smallest one of acknowledged split regions neighboring thereto.

Finally, every split region of the input picture PI is checked if it exceeds the population criterion of pixels. When the criterion is exceeded, the conforming split region is re-acknowledged by the circuit 101.

If it is not, the non-conforming region is integrated with a single neighboring acknowledged or re-acknowledged region or one of neighboring acknowledged or re-acknowledged regions that is most analogous thereto in e.g. characteristic or motion, so that an integral region is acknowledged to be identified by an identification number of the latter region, while an identification number of the former region is reserved for a later-use.

The region selector 102 selects one or more of the finally acknowledged split regions of the input picture PI, to output as the data D202, checking an identification number thereof. The precedence of selection may depend on an order of identification number, or on a command from a CPU which may provide an even precedence to two or more of the split regions to concurrently output them.

In the case a plurality of split regions are concurrently selected to be output from the selector 102 as the concerned region data D202, the precedence data D203 may have an identifier for identifying the concerned region in an entire region of the input picture PI, a pair of identification numbers for identifying the selected split regions in the concerned region or in the entire region of the input picture PI, and a pair of later-described precedence data provided one for a precedence of selection in temporal relationship between the split regions (i.e. an order in which the selected regions are processed) and the other for a precedence in compositional relationship between the split regions (i.e. an order in which the selected regions overlap each other).

It will be understood that, when a plurality of split regions or concerned regions are sequentially output, the temporal precedence thereamong for a processing at any place is identifiable from the order of their occurrences at the place, as a rule, unless otherwise described.

The data D202 comprises an imaginary picture composed of one or more selected split regions consisting of pixels valued and identified by one or more identification numbers and a mono-tone background consisting of non-identified pixels.

Each time when a split region is output as the data D202 from the selector 102, an output order thereof is combined with a checked identification number thereof to be output as the precedence data D203.

In the case of even precedence, an effective precedence among concurrently output regions may be recognized by their identification numbers, as necessary in the system 1.

The configuration detector 103 detects a contour shape of a split region D202, as it is concerned when input thereto, and outputs a configuration data D204 representing the contour shape of the concerned region D202.

In the case of even precedence, two or more identified regions are concurrently concerned so that a contour shape of an integral region is detected, as well as the contour shape of each identified region.

In the detector 103, each input pixel is checked if it has an identification number. Each identified pixel that necessarily resides in the concerned region is detected as an effective one, and has a pixel value thereof converted into one of a pair of binary values that the effectiveness. Any non-identified pixel that should reside outside the concerned region is detected as an ineffective one, and is provided with the other binary value. Accordingly, the configuration data D204 comprises a matrix of binary values that represents a picture in which any pixel is defined as an effective or ineffective.

When a concerned image is partially hidden by another image such as a background occasionally lying in front thereof, information on the hidden part is not covered by the configuration data D204. However, there may be employed multi-level symbols to cover such hidden information.

As shown in FIG. 2, the coding system 1 further includes a motion detector 104, a motion-compensated inter-frame prediction circuit 105, a subtractor or difference calculator 106, an orthogonal transformation circuit 107, and a quantization circuit 108.

The motion detector 104 is responsible for each selected split region D202 of the input picture PI, as it is concerned when input thereto, to refer to a corresponding split region D201 of the reference picture PR to detect a relative motion of the former region D202 to the latter region D201 in terms of a motion vector, to output an current motion data D205 representing the relative motion in combination with an identification number of the concerned region.

In the case of a concerned region consisting of two or more regions with an even precedence, there are calculated respective motion vectors of the constituent regions and a representative motion vector of the concerned region as a weightable average of the respective motion vectors, to be output as a current motion data D202 in combination with identification numbers of the constituent regions.

The prediction circuit 105 is responsible for the current motion data D202 to refer to a corresponding split region D201 of the reference picture PR or corresponding split regions D201 thereof to execute a motion-compensated inter-frame prediction of that region of the input picture PI which is concerned in the detectors 103 and 104, thereby generating a predicted region as pixel data D206 to be output in combination with an identification number or identification numbers of the concerned region. The predicted region D206 is deemed as a patch to an imaginary canvas-like picture and may be considered as a combination of the identified region, as it is effectively valued, and a zero-valued remaining region of a motion-compensated inter-frame prediction picture PP.

Incidentally, the motion detection as well as the motion-compensated inter-frame prediction may be effected by individual pixels or blocks in a well-known manner.

In a case the concerned region has no corresponding region in the reference picture PR stored in the memory 113, the motion data D205 is nullified and the predicted region D206 comprises pixels having a predetermined pixel value.

The difference calculator 106 calculates a difference of pixel data between the concerned region D202 of the input picture PI and the predicted region D206 of the prediction picture PP, to be output as a differernce data representative of a concerned region of a difference picture Pd in combination with an identification number or identification numbers of the concerned region D202, to the orthogonal transformation circuit 107.

At the orthogonal transformation circuit 107, the differernce data is orthogonally transformed to be output as a coded data to the quantization circuit 108.

For the orthogonal transformation, there may be applied a discrete cosine transform or an Hadamard transform. In such a case, a difference region represented by the difference data may be divided into blocks of a predetermined size for a block-level transformation.

Or alternately, there may be applied a wavelet transform or a sub-band division process. In this case, an entirety of the difference data may be concurrently transformed.

At the quantization circuit 108, the coded data output from the orthogonal transformation circuit 107 is quantized to be output as a quantized data D207 representative of a concerned difference region of the differernce picture Pd in combination with an identification number or identification numbers of the concerned region D202.

The system 1 yet includes an inverse quantization circuit 109, an inverse orthogonal transformation circuit 110, an adder 111, a configuration corrector 112, the frame memory 113, and a coding circuit 114.

The quantized data D207 is input to the coding circuit 114 and the inverse quantization circuit 109.

At the inverse quantization circuit 109, the data D207 is inverse-quantized to be output as an inverse quantized data to the inverse orthogonal transformation circuit 110, where it is inverse-orthogonally transformed by applying an inverse transform of an employed transform in the circuit 107, to be output as a decoded data representative of the concerned region of the difference picture Pd.

The adder 111 makes an addition of this decoded difference region and the predicted region D206 to output a local decoded region as pixel data D208 representative of a concerned region of a local decoded picture PL corresponding to the concerned region D202 of the input picture PI.

The configuration corrector 112 is responsible for the configuration data D204 to correct a shape of the identified region of the local decoded picture PL, to output pixel data D112 representing an identified region of the configuration-corrected local-decoded picture PLC".

Figure 5:
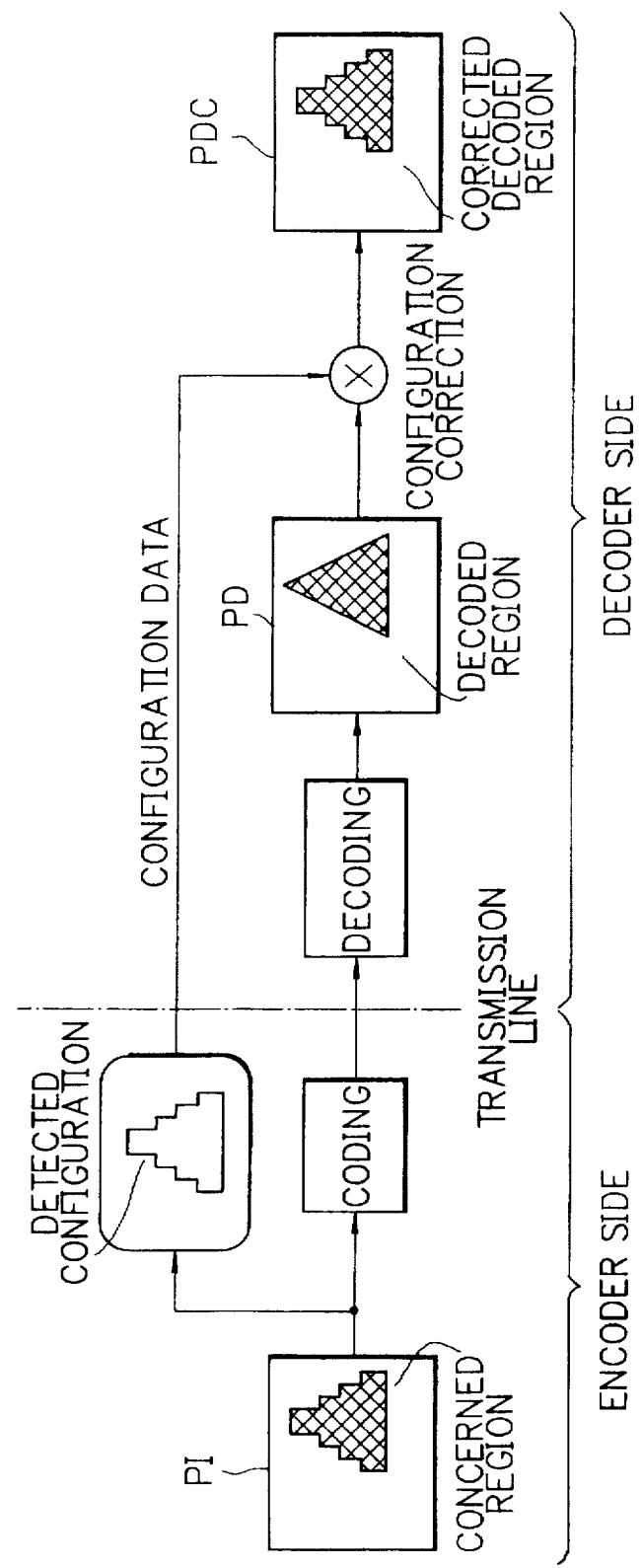
FIG. 5 is an illustration of a principle of a configuration correction of a concerned region according to the invention.

FIG. 5 illustrates a principle of a configuration correction of a concerned region according to the invention.

At the encoder side, a concerned region in an input picture PI has a stepped configuration defined by a contour line of an image of a moving object, which configuration is detected as it is, while pixel data therein are separately coded.

At the decoder side, the coded data are decoded to provide a decoded region as a concerned region of a decoded picture PD, which region has a stepless configuration and is corrected by a configuration data transmitted from the encoder side, obtaining a corrected decoded region as an identified region of a corrected decoded picture PDC, which region has a stepped configuration like the detected configuration.

The correction of cofiguration provides a remarkable effect, such as when a discrete cosine transform is applied to the orthogonal transformation, as it is performed on a block basis. In such a case, quantization errors tend to be dispersed over an entire area of a block employed in the transformation, causing undesirable deformations in a decoded region as well as a local decoded region.

Figure 6:
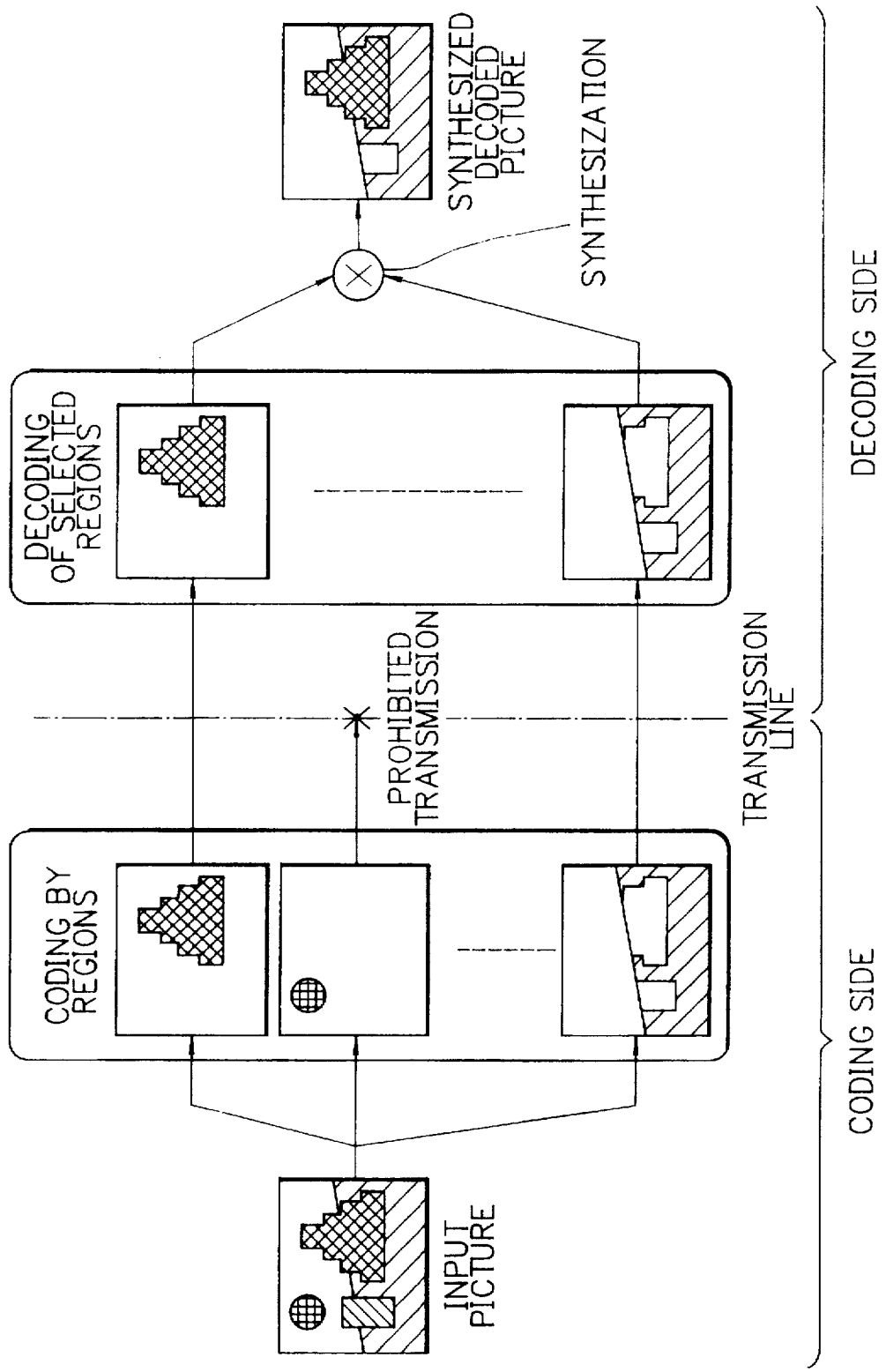
FIG. 6 is an illustration of a principle of a split region synthesization according to the invention.

Such deformations will not simply render an image quality visually disgraded, but also cause a mismatch between boundary lines of neighboring coded regions, when these regions are synthesized at the decoder side (See FIG. 6).

Therefore, the decoder need a correction of region configuration. Accordingly, a corresponding correction is necessitated for local decoding in the encoder of the system 1.

In a typical case, the correction of a decoded configuration comprises a cutting of an extra distortion.

For such a correction, the corrector 112 refers to the configuration data D204 to acknowledge ineffective pixels around the concerned region D202, before cutting those pixel data of the local decoded region D208 which correspond to the acknowledged ineffective pixels. As a result, undesirable distortions due to the orthogonal transformation and the quantization are removed.

The frame memory 113 has an input selector 113b, which responds to the precedence data D203 and an indentification number of each configuration-corrected local-decoded region D112 output from the configuration corrector 112, to input the corrected region into a corresponding memory, where it is stored. Stored data in memories are sequentially read in a subseqeunt frame, to be each referred to as a corresponding split region D201 of a reference picture PR in accordance with a selection of the output selector 113b.

Therefore, when a concerned split region D202 of the input picture PI is processed in the system 1, no more than such a region D201 of the reference picture PR that has an inter-frame correlation thereto is referred to, effectively eliminating various influences of the other regions.

The coding circuit 114 converts the precedence data D203, configuration data D204, motion data D205 and quantized data D207 into a symbol stream or bitstream representing a coded picture PC to be output to the decoder of the system 1.

In this coding, the motion data D205 and quantized data D207 may be symbolized by a length variable data coding method, as well as the precedence data D203.

Figure 3:
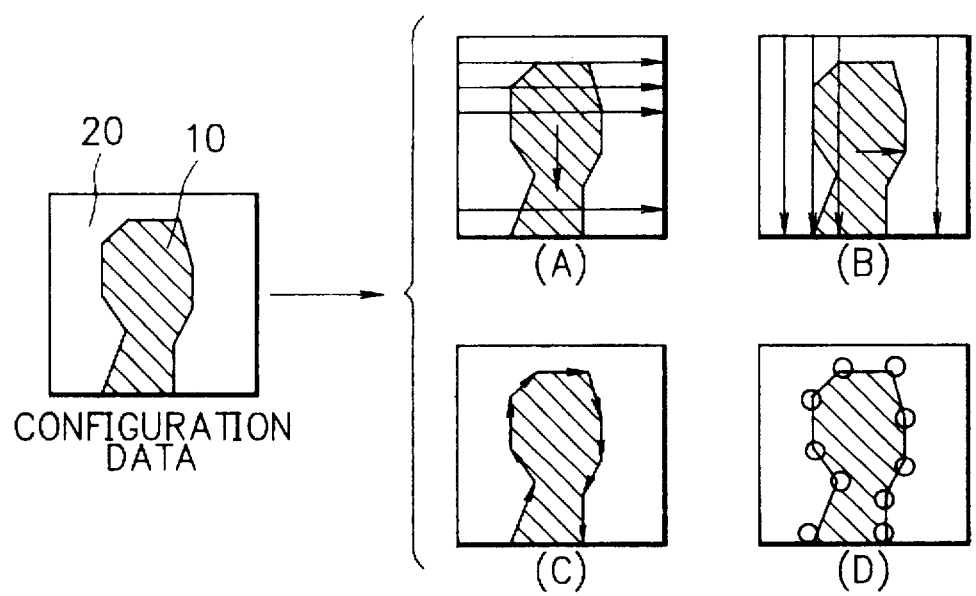
FIG. 3 is an illustration for describing a coding process of configuration data in the system of FIG. 2.

FIG. 3 illustrates a principle of a coding of configuration data according to the invention.

The configuration data is provided in a form of a matrix of binary data representing a double-tone shadow picture composed of an effective region 10 and an ineffective region 20, which may be coded into a compressed bit stream by one of four methods (A), (B), (C) and (D) shown in FIG. 3.

In the method (A), rows of the pixel matrix are sequentially scanned, detecting a serial pattern of effective and ieffective pixels therein, each from the left to the right, one by one from the top to the bottom. Letting e.g. "1" be an effective and "0" be an ineffective, there will be given a symbol pattern of a combination of "1"s and "0"s, which may be replaced by a combination of bits representing run lengths of "1" and "0", respectively, permitting a coding with an efficient compression.

In the method (B), columns of the pixel matrix are likewise scanned.

The pixel matrix may naturally be scanned in any other applicable manner such as by a diagonal scan or alternating scan. Moreover, a number of different scan methods may be provided, permitting an optimal one to be selected in combination with an additional symbol representing the selected method.

In the mehtod (C), an effective region is scanned along a contour line thereof for a coding of positions of pixels thereon, which may be achieved by using e.g. chain symbols.

In the method (D), an effective region is symbolized by coding characteristic or representative points of straight, curvilinear and/or polygonal line segments constituting a contour line thereof, permitting decoded points to be connected by similar line segments to describe a contour of a corresponding region at the decoder end.

In the case of (C) or (D), a coded contour line or coded segments thereof may have an additional symbol representing which side thereof is an effective region.

Or alternately, an enclosing side to define an effective region may be promized relative to a scan direction in which a contour line is scanned.

The coding system of FIG. 2 adaptively splits an input motion pitcure. This system may thus be modified for separately encoding a plurality of motion images having their arbitrary configurations to permit a corresponding number of decoded motion images to be synthesized at the decoder end.

Figure 4:
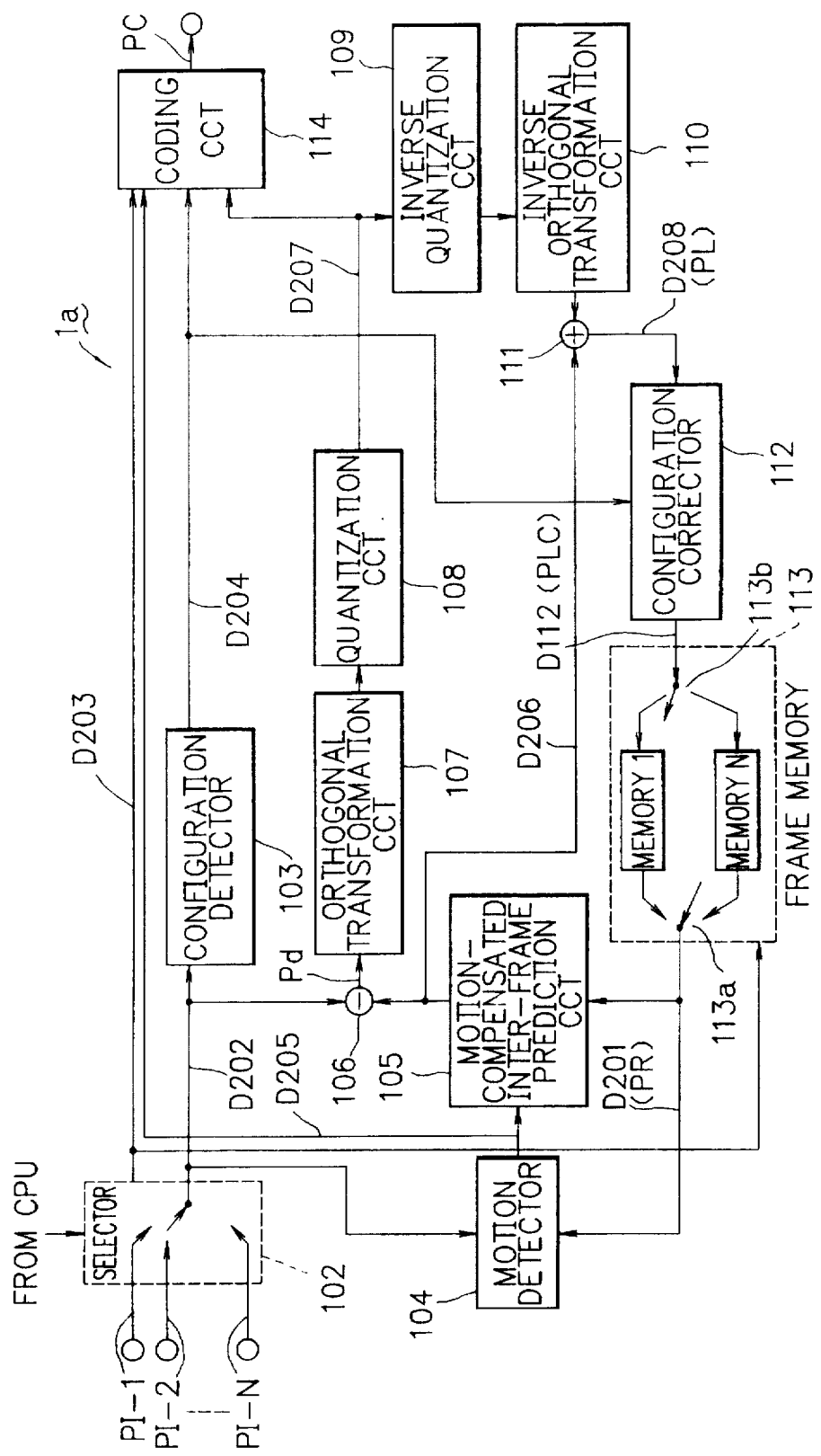
FIG. 4 is a block diagram of a motion picture coding system according to a modification of the first embodiment of the invnetion.

FIG. 4 is a block diagram of a motion picture coding system according to a modification of the first embodiment.

In FIG. 4, designated at reference character 1a is the coding system according to the modification.

The coding system 1a has a total of N image input terminals each connected to a corresponding one of unshown image sources to receive therefrom an image picture PI-i ($1 \leq i \leq N$) including one or more motion image pictures of which a respective one consists of a real motion image identified by an identification number and a dummy or imaginary background, at least one static image picture consisting of an identified real static image and a dummy or imaginary background and at least one background picture consisting of an identified size-variable real front-background image that may have a deformable image frame and an identified size-variable real rear-background image that may have a stereotype image frame.

One of the input pictures PI-i may be an insertion image to a local region, or a letter or template image to be overwritten on a background.

The system 1a further includes an image selector 102 responsible for a control signal from an unshown CPU to select one or more of a controlled number of image pictures PI-i in a time-overlapping manner or in a time-dividing manner so that at least one identified and acknowledged real image is output as a split region D202 in combination with an identification number thereof, and to concurrently output an associated precedence data D203 that represents a relationship between the identification number and a precedence of selection order and a compositional relationship between the identification number and a precedence of overlapping position, as it is instructed from the CPU.

The system 1a has a similar function to the system 1, so that an arbitrary number of real images can be processed every frame.

When two images overlap each other, that one which is higher in precedence of overlapping position comes in front of the other. Each split region D201 output from a frame memory 113 has information on the compositional relationship.

Figure 7:
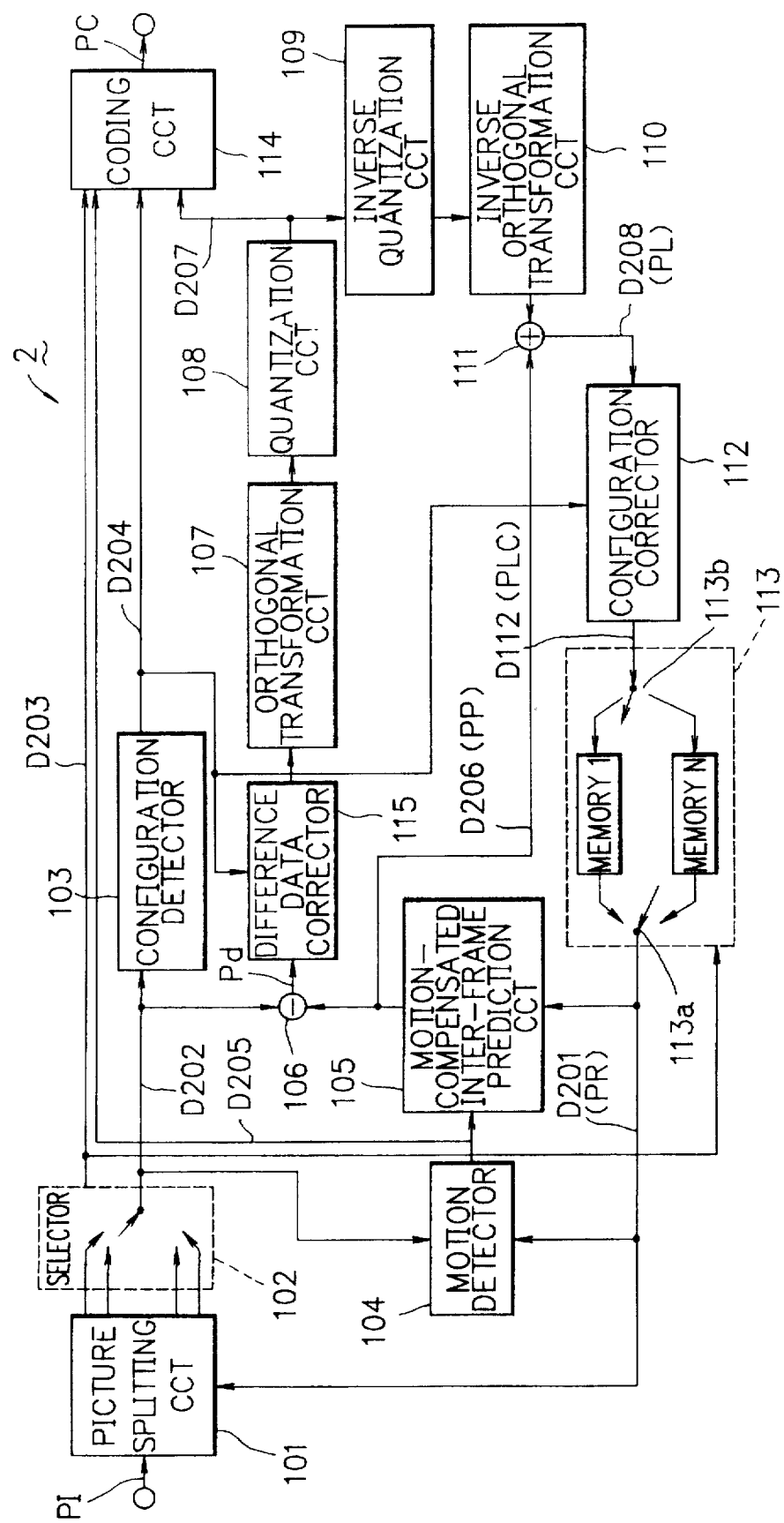
FIG. 7 is a block diagram of a motion picture coding system according to a second embodiment of the invention.

FIG. 7 is a block diagram of a motion picture coding system according to a second embodiment of the invention.

In FIG. 7, designated at reference character 2 is the coding system according to the second embodiment.

The coding system 2 includes a difference data corrector 115 for responding to a configuration data D204 to correct a shape of an identified split region of a difference picture Pd. Accordingly, ineffective pixel data are cut off, before effective pixel data are input to an orthognal transformation circuit 107.

Figure 8A:
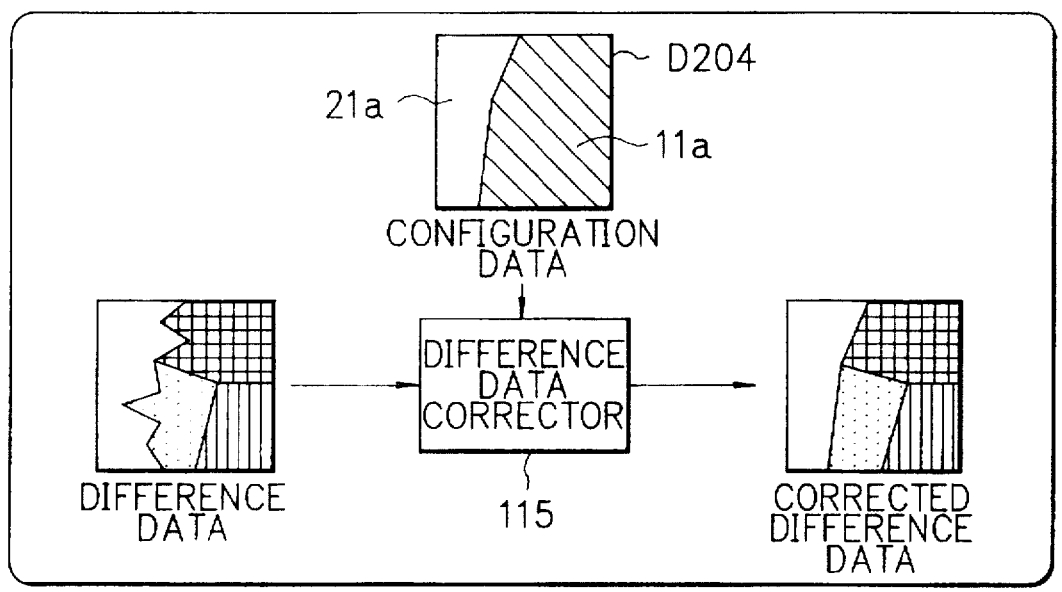
FIGS. 8A and 8B are illustrations of a principle of difference data correction according to the invention.
Figure 8B:
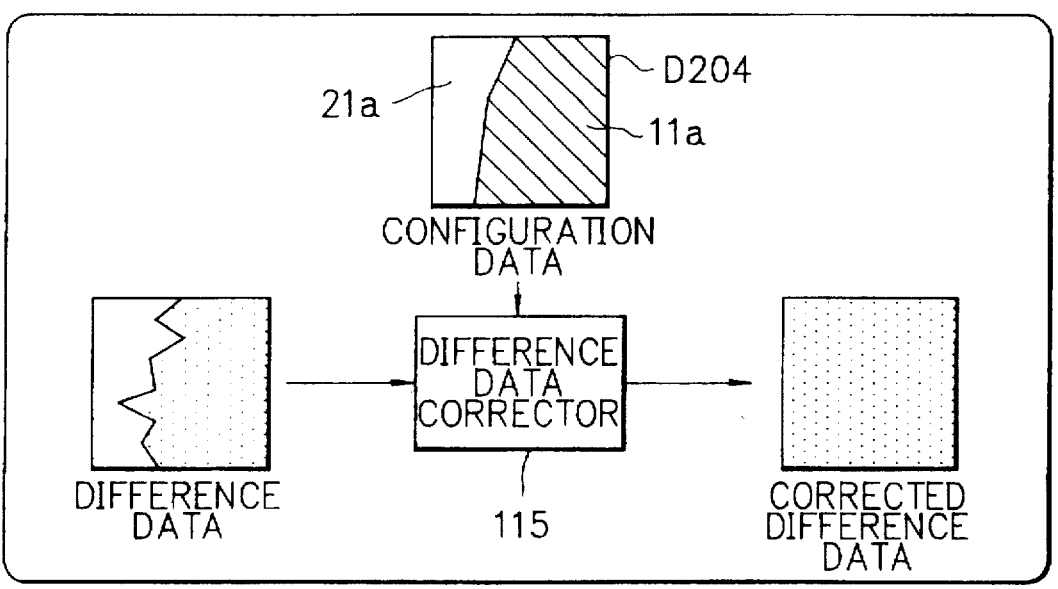

FIGS. 8A and 8B illustrate a principle of difference data correction according to the invention.

In the difference data corrector 115, a difference data is masked with a configuration data D204 composed of an effective region 11a and an ineffective region 21a, to cut off pixel data in a region (Pd) overlapping the ineffective region 21a, i.e. to pick up pixel data in a region (Pd) overlapping the effective region 11a.

FIG. 8A shows a case the picked up pixel data have a larger variance than a threshold value, so they are directly output as they are corrected. For the correction, those difference data observed in a region decided ineffective by a comparison with the configuration data D204 are cut off, effectively suppressing occurrences of undesirable data due to a subsequent orthogonal transformation.

FIG. 8B shows a case the picked up pixel data have a variance not exceeding the threshold value, so an ineffective region has dummy data interpolated or extrapolated thereover from difference data of an effective region, for a correction to eliminate edge components of the ineffective region, thereby effectively suppressing occurrences of high-frequency components due to the orthogonal transformation.

A local decoded region D208 is reshaped by a configuration corrector 112 in accordance with the configuration data D204, irrespective of whether or not the difference data of an ineffective region are cut off.

Figure 9:
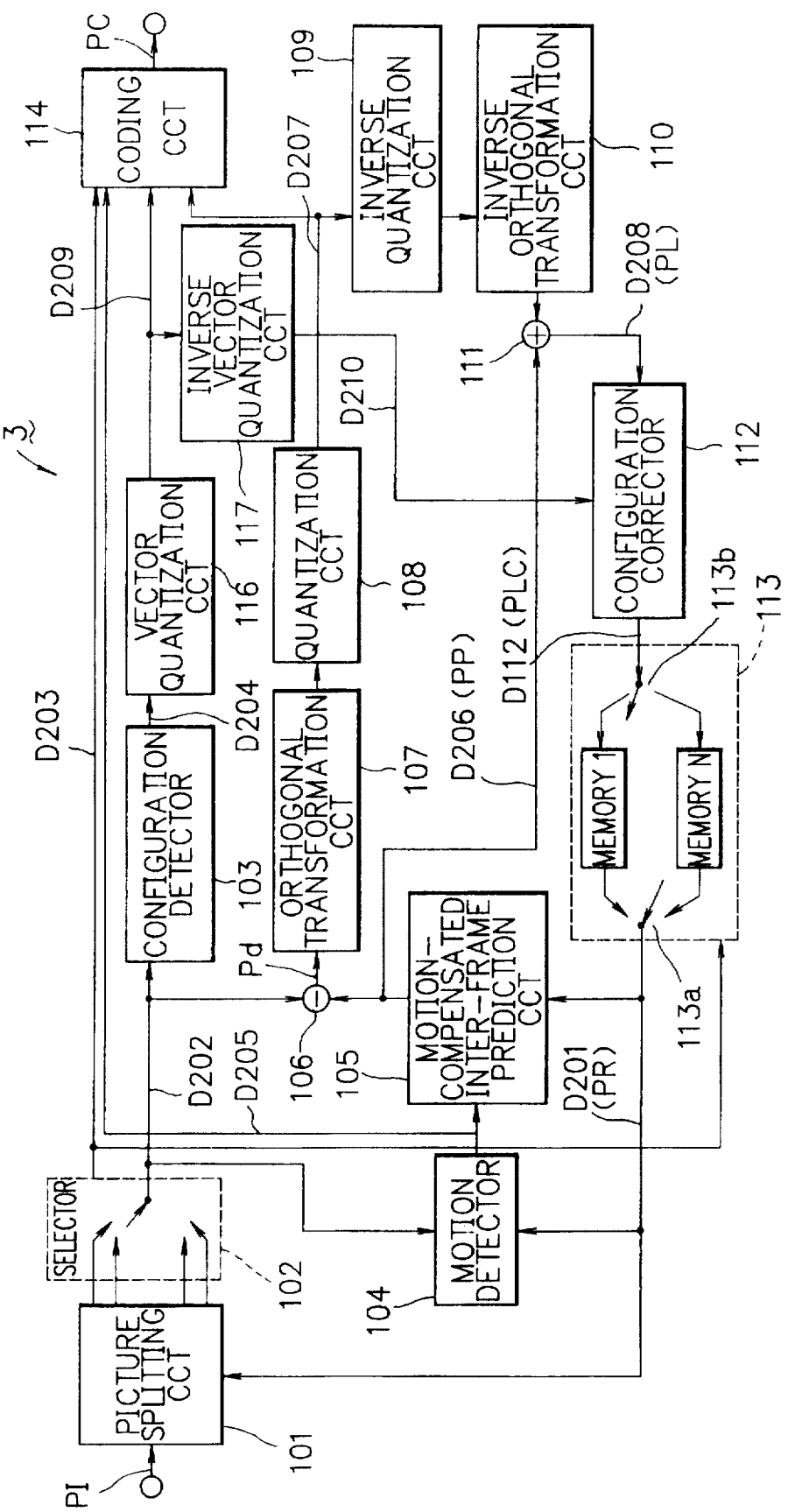
FIG. 9 is a block diagram of a motion picture coding system according to a third embodiment of the invention.

FIG. 9 is a block diagram of a motion picture coding system according to a third embodiment of the invention.

In FIG. 9, designated at reference character 3 is the coding system according to the third embodiment.

The coding system 3 includes vector quantization circuit 116 for vector-quantizing a configuration data D204 to achieve a remarkable reduction of code length thereof, and an inverse vector quantization circuit 109 in which the vector-quantized configuration data D209 is inverse vector-quantized to be restored into a configuration data D210, which is employed for a configuration correction of a local decoded region D208.

The vector quantization circuit 116 vector-quantizes the configuration data D204 that is output from a configuration detector 103 in a form of a matrix of binary pixel data. The vector quantization circuit 116 has stored therein a definite number of preset patterns of binary pixel data, and selects to output one of them that has a maximum likelihood to the configuration data D204.

The number of preset patterns may be reduced to effectively reduce a code length of output data D209. In failure to find an adequate resemblance in any preset pattern, the configuration data D204 may be output, as it is, to a coding circuit 114. When such a configuration data D204 is input, the coding circuit 114 converts it into a bitstream in the manner described with reference to FIG. 3. In the case of a vector-quantized configuration data D209, the circuit 114 directly processes it to form a bitstream.

Providing a sufficient allowance in bit rate of a transmission line, the vector quantization circuit 116 may apply a tight criterion to a decision of likelihood between a preset pattern and a configuration data D204, so that complicated configurations may be directly output as many as possible without vector quantization, to permit a delicate coding to be employed for a faithful reproduction of an original shape of a concerned region.

Figure 10:
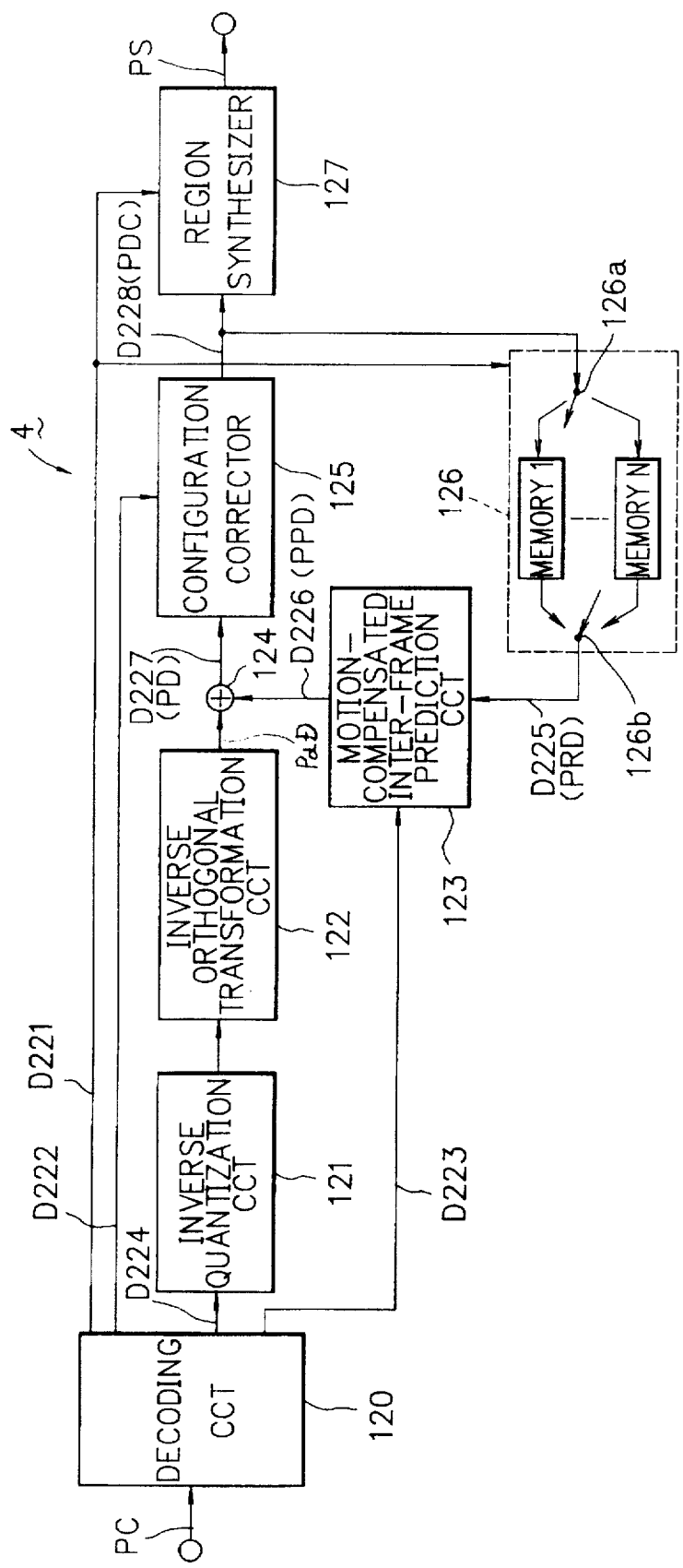
FIG. 10 is a block diagram of a motion picture decoding system according to a fourth embodiment of the invention.

FIG. 10 is a block diagram of a motion picture decoding system according to a fourth embodiment of the invention.

In FIG. 10, designated at reference character 4 is the decoding system according to the fourth embodiment.

The decoding system 4 is cooperative with the coding system 1 of FIG. 2, for decoding a sequence of split regions of a coded picture PC to output a synthesized decoded picture PS.

The system 4 includes a decoding circuit 120 for inversely converting a bitstream of a concerned region composed of one or more identified regions of a coded picture PC into a combination of a decoded precedence data D221 of the concerned region, a decoded configuration data D222 of the identified region(s) and/or the concerned region, a decoded motion data D223 of the identified region(s) and/or the concerned region and a decoded quantized data D224 of the concerned region.

The system 4 further includes an inverse quantization circuit 121, an inverse orthogonal transformation circuit 122, a motion-compensated inter-frame prediction circuit 123 and a frame memory 126.

At the inverse quantization circuit 121, the decoded quantized data D224 is inverse-quantized to be output as an inverse-quantized data to the inverse orthogonal transformation circuit 122, where it is inverse-orthogonally transformed to be output as a decoded data representing a concerned region of a decoded difference picture PdD.

The prediction circuit 123 is responsible for the decoded motion data D223 to refer to a corresponding split region D225 of a reference picture PRD stored in the frame memory 126 or corresponding split regions D225 thereof to execute a motion-compensated inter-frame prediction of that region of the input picture PI which is concerned in the configuration detector 103 and motion detector 104 of the coding system 1, thereby generating a predicted region as pixel data D226 to be output in combination with an identification number or identification numbers of the concerned region.

The frame memory 126 is identical to the frame memory 113 of the coding system 1, and has an input selector 126a, a total of N sequentially numbered memories and an output selector 126b.

The system 4 still further includes an adder 124, a configuration corrector 125 and a region synthesizer 127.

The adder 111 makes an addition of the concerned region of the decoded difference picture PdD and the predicted region D226 to output pixel data D227 representative of a concerned region of a decoded picture PD before configuration correction.

The configuration corrector 125 is responsible for the decoded configuration data D222 to correct a shape of each identified region D227 of the decoded picture PD, to output pixel data D228 representing an identified region of a configuration-corrected decoded picture PDC.

This data D228 is stored in a corresponding memory in the frame memory 126 in accordance with the decoded precedence data D221, to be output as reference data D225 for a decoding in a subsequent frame.

The region synthesizer 127 synthesizes a plurality of configuration-corrected coded regions D228 in accordance with the decoded precedence data D221, to output a synthesized region as part or entirety of the synthesized picture PS.

The decoding system 4 may decode one or more selected regions in a concerned region. As shown in FIG. 6, for a decoding of any concerned region that may be a single identified region or identical to an entirety of a picture, there is need none of remaining regions of a coded picture PC nor of a reference picture PRD. Therefore, no errors will occur in the motion-compensated inter-frame prediction, and no rupture of decoding will be resulted.

Figure 11:
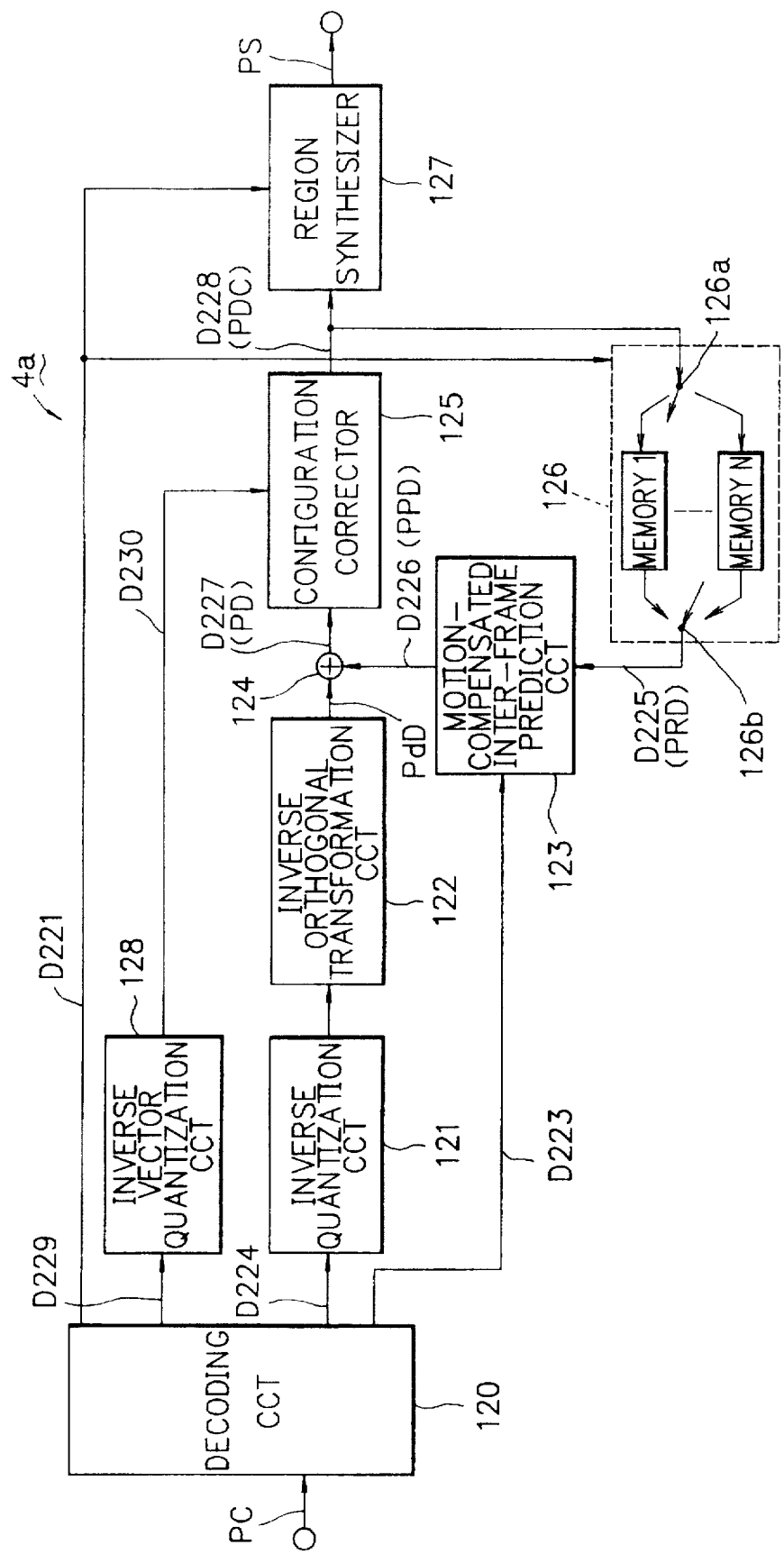
FIG. 11 is a block diagram of a motion picture decoding system according to a modification of the fourth embodiment of the invention.

FIG. 11 is a block diagram of a motion picture decoding system according to a modification of the fourth embodiment of the invention.

In FIG. 11, designated at reference character 4a is the decoding system according to the modification.

The decoding system 4a is cooperative with the coding system 3 of FIG. 9, for decoding a sequence of split regions of a coded picture PC that contains a vector-quantized configuration data D209.

The system 4a includes a decoding circuit 120 for inversely converting a bitstream of a concerned region of the coded picture PC into a combination of a decoded precedence data D221, a decoded vector-quantized configuration data D229, a decoded motion data D223 and a decoded quantized data D224, and an inverse vector quantization circuit 128 for inverse vector-quantizing the vector-quantized configuration data D229 to output a restored configuration data D230, which is referred to by a configuration corrector 125 for a configuration correction.

Figure 12:
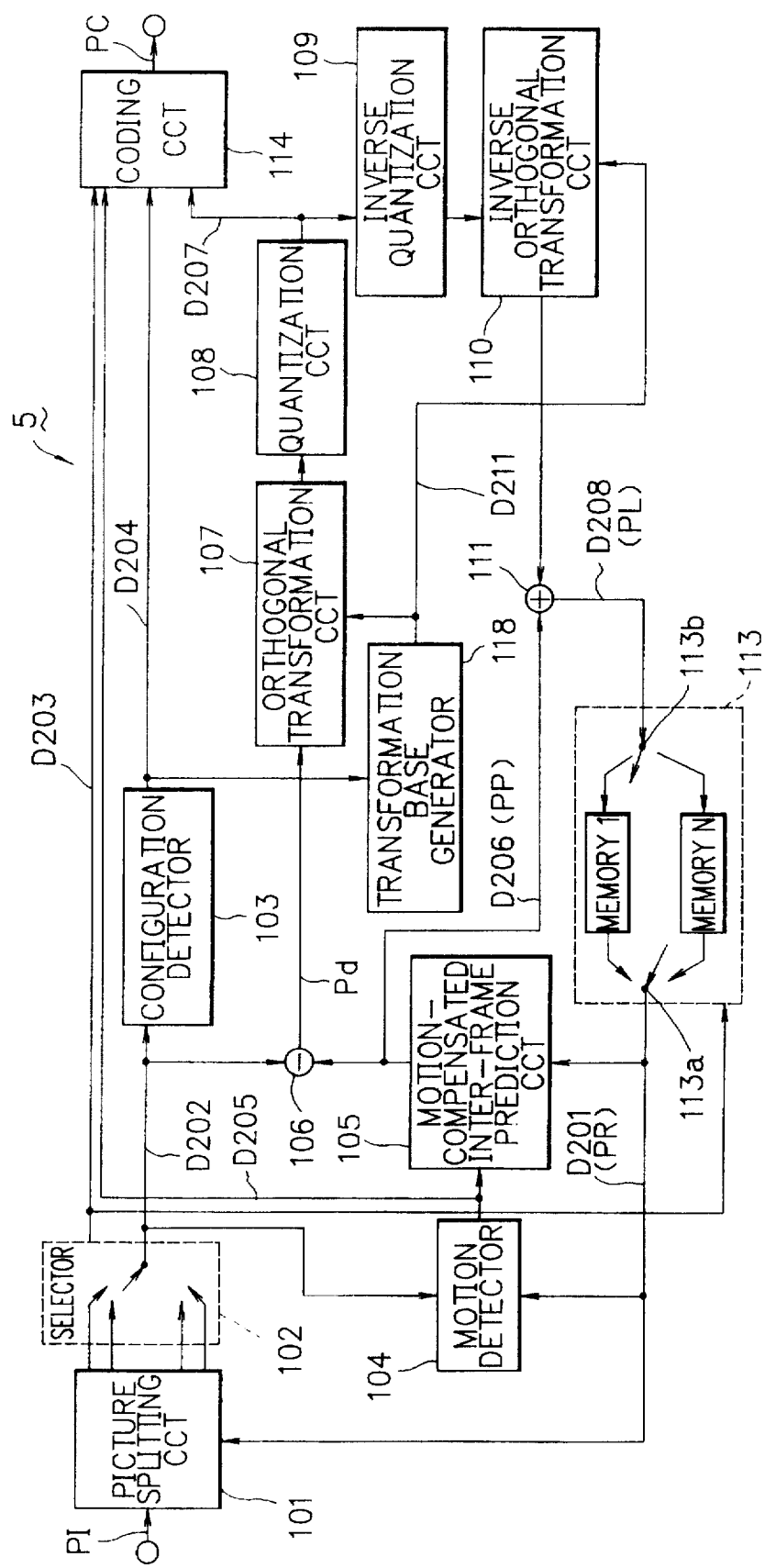
FIG. 12 is a block diagram of a motion picture coding system according to a fifth embodiment of the invention.

FIG. 12 is a block diagram of a motion picture coding system according to a fifth embodiment of the invention.

In FIG. 12, designated at reference character 5 is the coding system according to the fifth embodiment.

The coding system 5 generates a transform base in dependence on a configuration data, for use in an orthogonal transformation to permit an efficient processing thereof.

The system 5 thus includes a transform base generator 118 for generating to output an arbitrarily configurable orthogonal transform base D211 depending on a configuration data D204 output from a configuration detector 103.

For generation of the transform base, there may be applied a Gram and Shmidt's method discussed in the paper by M. Gilge, T. Engelhardt and R. Mehlan, "Coding Of Arbitrarily Shaped Image Segments Based On A Generalized Orthogonal Transform", Signal Processing: Image Communication 1, pp. 153–180, 1989.

In the system 5, the orthogonal transform base generated at the generator 118 is input to an orthogonal transformation circuit 107, where it is employed for orthogonally transforming a difference data from a difference calculator 106 to obtain an identical number of orthogonally transformed data to a number of effective pixels in the difference data, and to an inverse orthogonal transformation circuit 110, where it is employed for inverse-orthogonally transforming an inverse-quantized data.

Moreover, an adder 111 makes an addition of the inverse-orthogonally transformed data and a motion-compensated inter-frame prediction data D206 to obtain a concerned region D208 of a local decoded picture PL, which is stored in a frame memory 113, as it is without configuration correction.

In the system 5, therefore, a voluntarily configured difference region is directly subjected to an orthognal transformation, and an inverse orthogonal transformation permits an original shape to be restored. Accordingly, the correction of configuration in the system 1 is unnecessary in the system 5. Other circuitry of the system 5 than described is identical to the system 1.

Figure 13:
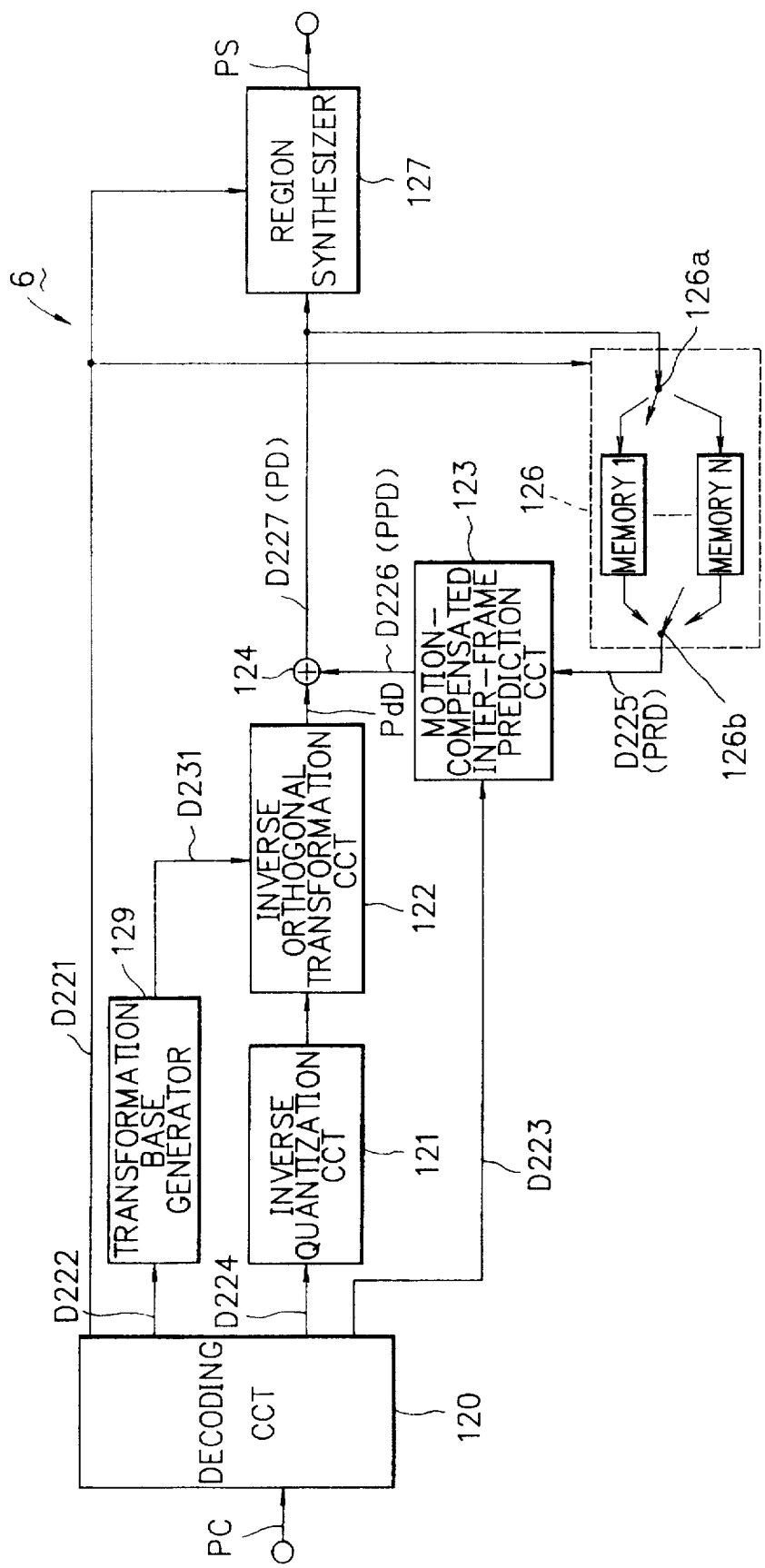
FIG. 13 is a block diagram of a motion picture decoding system according to a sixth embodiment of the invention.

FIG. 13 is a block diagram of a motion picture decoding system according to a sixth embodiment of the invention.

In FIG. 13, designated at reference character 6 is the decoding system according to the sixth embodiment.

The decoding system 6 is cooperative with the coding system 5 of FIG. 12, for decoding a sequence of split regions of a coded picture PC therefrom to output a concerned region of a synthesized picture PS.

The system 6 includes a decoding circuit 120 for inversely converting a bitstream of a concerned region of the coded picture PC into a combination of a decoded precedence data D221, a decoded configuration data D222, a decoded motion data D223 and a decoded quantized data D224, and a transformation base generator 129 for generating to output an arbitrarily configurable orthogonal transform base D231 depending on the decoded configuration data D222. For generation of the transform base, there may be appplied the same method as the system 5.

The system 6 further includes an inverse quantization circuit 121, an inverse orthogonal transformation circuit 122, a motion-compensated inter-frame prediction circuit 123, an adder 124, a frame memory 126 and a region synthesizer 127.

At the inverse quantization circuit 121, the decoded quantized data D224 is inverse-quantized to be output as an inverse-quantized data to the inverse orthogonal transformation circuit 122, where it is inverse-orthogonally transformed by using the orthogonal transform base D231, to be output as a decoded data representing a concerned region of a decoded difference picture PdD.

The prediction circuit 123 is responsible for the decoded motion data D223 to refer to a corresponding split region D225 of a reference picture PRD stored in the frame memory 126 or corresponding split regions D225 thereof to execute a motion-compensated inter-frame prediction of a concerned region of an input picture PI to the coding system 5, thereby generating a predicted region as pixel data D226 to be output in combination with an identification number or identification numbers of the concerned region.

The adder 111 makes an addition of the concerned region of the decoded difference picture PdD and the predicted region D226 to output pixel data D227 representative of a concerned region of a decoded picture PD.

The frame memory 126 is identical to the frame memory 113 of the coding system 5. Each identified region of the decoded picture PD is stored in a corresponding memory in the frame memory 126 in accordance with the decoded precedence data D221, to be output as reference data D225 for a decoding in a subsequent frame.

The region synthesizer 127 synthesizes a plurality of coded regions D227 in accordance with the decoded precedence data D221, to output a synthesized region as part or entirety of the synthesized picture PS.

In the system 6, therefore, an original shape of a split region of a decoded picture PD is directly restored. Accordingly, it is unnecessary for the system 6 to correct a shape of a split region of a decoded picture, as in in the system 4. Other circuitry of the system 6 than described is identical to the system 4.

In the foregoing description, the systems 2 to 6 according to the second to sixth embodiments may preferably be modified by additionally providing information on a compositional relationship to a precedence data, like the system 1a modified from the system 1.

The compositional relationship defines a precedence of overlapping position between identified split regions, which positional precedence will be described below with reference to FIGS. 14 and 15.

Figure 14:
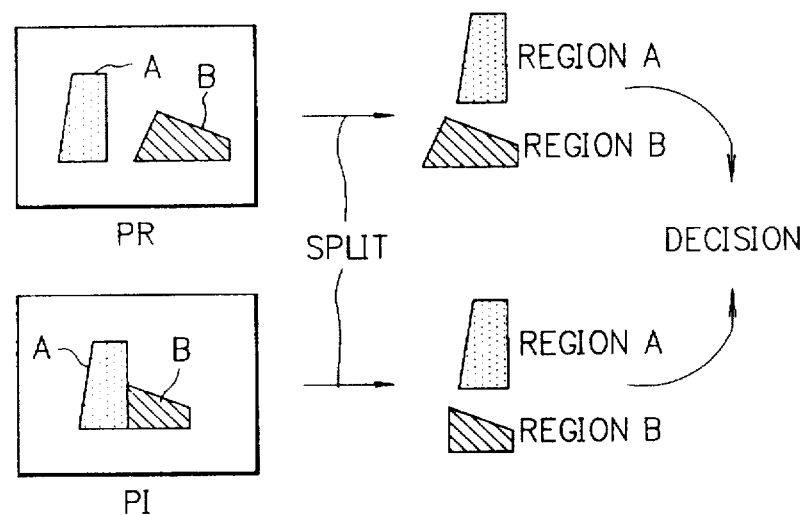
FIGS. 14 and 15 are illustrations for describing a concept of a precedence of overlapping position according to the invention.

In FIG. 14, a positional precedence is detected between split regions A and B, by a comparison between a reference picture PR and an input picture PI.

The region A has a smaller inter-frame variation, and should have come on in front of the region B in a current frame. Therefore, the region A is provided with a higher positional precedence than the region B.

Such a detection may be executed by a CPU of each embodiment.

Figure 15:
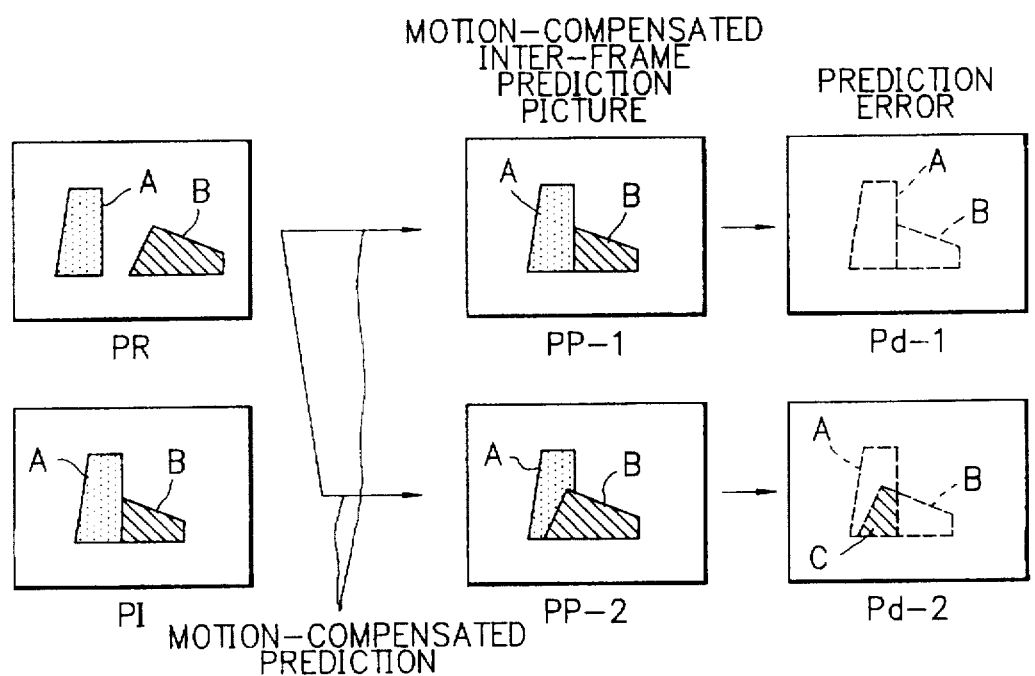

In FIG. 15, upper three illustrations show a reference picture PR as a previous input picture, a prediction picture PP-1 predicted therefrom with a higher positional precedence to the region A, and a difference picture Pd-1 representative of a prediction error of the picture PP-1.

Lower three illustrations show a current input picture PI, a prediction picture PP-1 thereof predicted with a higher positional precedence erromeously given to the region B, and a difference picture Pd-2 representative of a prediction error of the picture PP-2.

Like this, the positional precedence has a significant role in a motion picture prediciton, in paricular when an even precedence of selection order is provided to a plurality of identified regions.

It will be understood that a positional precedence may be likewise defined for a configuration detection, a motion detection, a motion-compensated inter-frame prediction and a storing of local decoded picture in a coding system and for a motion-compensated inter-frame prediction, a synthesization and a storing of local decoded picture in a decoding system.

The positional precedence is coded (by CPU) to provide or update an associated composition data, as necessary, when it is detected as described.

FIG. 16 illustrates exemplary pixel data and composition data according to the invention.

It is now assumed that a pair of split regions A and B of an input picture PI or PI-i or input pictures PI-i and PI-j (i≠j) (hereafter collectively "input picture PI", as it is a motion picture to be coded) are concurrently selected by the selector 102 of FIG. 2 or FIG. 4. The split regions A and B may thus be contained both in a single concerned region or separately in a pair of concerned regions.

The split regions A and B have their pixel data PD(A) and PD(B) identified in the concerned region(s) so that a common picture frame in which the input picutre PI is mapped has a sum set of pixel data PD(A) and PD(B) identified therein.

In the common frame, if the pixel data PD(A) and PD(B) overlap each other, a positional precedence is detected therebetween and relatively or absolutely evaluated e.g. by using the same number as an identification number of one of the regions that should come on the other or by a pair of updatable numbers selected from a series of integers equivalent in number to a total number of pixels or split regions in the common frame.

Therefore, letting CD(A,B) be a data representing the detected positional precedence between the regions A and B, the composition data in an associated precedence data D203 includes the data CD(A,B) defined by either a relative positional precedence value CD(A) or CD(B) or a pair of absolute positional precedence values P(A) and P(B).

In an upper illustration of FIG. 16, the region A comes on or in front of the region B so that CD(A,B)~{P(A)>P(B)}, where "~" represents a presence of a significant relationship.

To the contrary, in a upper illustration of FIG. 16, the region A goes under or behind the region B so that CD(A,B)~{P(A)<P(B)}.

It will be seen that the composition data may include various data on compositional characters of an input motion picture, such as an inclusion relationship data that may reduce a quantity of positional precedence data.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A motion picture coding system for coding a motion picture system, the system comprising:

a first means for generating a concerned region of a current image having a set of pixel data addressed pixels thereon, and an identifying data set for identifying the concerned region in an entire region of the motion picture;

a second means responsible for receiving the identifying data set and generating a reference image representative of a previous image of the current image in a current frame;

a third means for detecting a motion between the reference image and the current image and generating detected motion data corresponding thereto;

a fourth means for receiving the detected motion data and motion-compensating the reference image to generate a prediction image of the current image;

a fifth means for generating a difference image between the current image and the prediction image;

a sixth means for detecting a configuration of the concerned region and generating detected configuration data corresponding thereto;

a seventh means for coding the detected configuration data, the detected motion data, the difference image and the identifying data set, in a compressing manner to output a symbol sequence, said seventh means including conversion means for converting the difference image into a set of compressed data;

an eighth means for inverse-converting the set of compressed data to provide a local decoded image of the difference image;

a ninth means for adding the local decoded image of the difference image to the prediction image to provide a local decoded image of the current image;

a tenth means for correcting a configuration of the local decoded image of the current image in accordance with the detected configuration of the concerned region to provide a corrected image of the local decoded image of the current image; and an eleventh means for storing the corrected image in an identifiable manner to be read as the reference image in a subsequent frame of the current frame.

2. A motion picture coding system according to claim 1, wherein the first means comprises:

a picture splitting means receiving for receiving a reference picture representative of a previous picture of the motion picture and splitting the motion picture into a plurality of identifiable images significantly correlated with a plurality of identified images of the reference picture so that the current image comprises one or more of the plurality of identifiable images; and a selector means for sequentially selecting the one or more identifiable images to provide the current image and for providing the identification data set.

3. A motion picture coding system according to claim 1, wherein the concerned region comprises a first split region and a second split region so that the current image is composed of a first identifiable image on the first split region and a second identifiable image on the second split region;

wherein the identifying data set comprises an identification data for identifying the concerned region in the entire region of the motion picture, a first identification number for identifying the first split region of the concerned region, and a second identification number for identifying the second split region of the concerned region;

wherein the first means sequentially selects to provide the first and second identifiable images so that a preceding one of the first and second identification numbers has a precedence of selection to the other; and wherein the second means is responsive to a combination of the identification data and the first and second identification numbers for sequentially selecting to provide those of a plurality of divided images of the reference image corresponding to the first and second identifiable images.

4. A motion picture coding system according to claim 1, wherein the first means generates combination of a first concerned region of said current image, having a first set of pixel data of addressed pixels thereon and a second concerned region of said current image, having a second set of pixel data of addressed pixels thereon, and wherein the identifying data set comprises:

an identification data for identifying the combination of said first and second concerned regions in the entire region of the motion picture;

a first identification number for identifying said first concerned region in the combination of said first and second concerned regions;

a second identification number for identifying said second concerned region in the combination of said first and second concerned regions; and a composition data for defining an overlap precedence between an arbitrary one of the addressed pixels on said first concerned region and a corresponding one of the addressed pixels on said second concerned region.

5. A motion picture decoding system for decoding a symbol sequence representing a detected configuration of a concerned region identified in an entire region of a motion picture, a detected motion between a current image defined by a combination of the concerned region and a set of pixel data of addressed pixels thereon and a reference image representative of a previous image of the current image in a current frame, a difference image between the current image and a prediction image thereof generated by motion-compensating the reference with the detected motion, and an identifying data set for identifying the concerned region in an entire region of the motion picture, the system comprising:

a first means for decoding the symbol sequence to provide a decoded configuration representing the detected configuration, a decoded motion representing the detected motion, a decoded image of the difference image, and a decoded data set representing the identifying data set;

a second means for receiving the decoded motion and motion-compensating a representative image of the reference image in the current frame to generate a decoded image of the prediction image;

a third means for adding the decoded image of the difference image to the decoded image of the prediction image to provide a decoded image of the current image;

a fourth means for correcting a configuration of the decoded image of the current frame in accordance with the decoded configuration to provide a corrected image of the decoded image of the current image; and a fifth means for receiving the decoded data set and storing the corrected image in an identifiable manner to be read as the representative image in a subsequent frame of the current frame, wherein the concerned region comprises a first split region and a second split region so that the current image is composed of a first identifiable image on the first split region and a second identifiable image on the second split region, wherein the identifying data set comprises an identification data for identifying the concerned region in the entire region of the motion picture, a first identification number for identifying the first split region of the concerned region, a second identification number for identifying the second concerned region of the concerned region, wherein the first and second identifiable images are sequentially provided so that a preceding on the first and second identification numbers has a precedence of selection to the other, wherein the decoded data set includes data representing the identification data, the first and second identification numbers and the precedence of selection, and wherein the corrected image comprises a first corrected image representing the first identifiable image a second corrected image representing the second identifiable image.

6. A motion picture coding method for coding a motion picture, the method comprising:

a first step of generating a concerned region of a current image having a set of pixel data of addressed pixels thereon, and an identifying data set for identifying the concerned region in an entire region of the motion picture;

a second step of responding to the identifying data set to provide a reference image representative of a previous image of the current image in a current frame;

a third step of detecting a motion between the reference image and the current image;

a fourth step of responding to the detected motion to motion-compensate the reference image to generate a prediction image of the current image;

a fifth step of generating a difference image between the current image and the prediction image;

a sixth step of detecting a configuration of the concerned region;

a seventh step of coding the detected configuration, the detected motion, the difference image and the identifying data set, in a compressing manner to output a symbol sequence;

an eighth step of inverse-converting the set of compressed data to provide a local decoded image of the difference image;

a ninth step of adding the local decoded image of the difference image to the prediction image to provide a local decoded image of the current image;

a tenth step of correcting a configuration of the local decoded image of the current image in accordance with the detected configuration of the concerned region to provide a corrected image of the local decoded image of the current image; and an eleventh step of responding to the identifying data set to store the corrected image in an identifiable manner to read as the reference image in a subsequent frame of the current frame.

7. A motion picture coding method according to claim 6, wherein the first step comprises:

responding to a reference picture representative of a previous picture of the motion picture to split the motion picture into a plurality of identifiable images significantly correlated with a plurality of identified images of the reference picture so that the current image comprises one or more of the plurality of identifiable images; and sequentially selecting the one or more identifiable images to provide the current image and for providing the identification data set.

8. A motion picture coding method according to claim 6, wherein the concerned region comprises a first split region and a second split region so that the current image is composed of a first identifiable image on the first split region and a second identifiable image on the second split region, wherein the identifying data set comprises:

an identification data for identifying the concerned region in the entire region of the motion picture;

a first identification number for identifying the first split region of the concerned region; and a second identification number for identifying the second split region of the concerned region, wherein the first step includes sequentially selecting to provide the first and second identifiable images so that a preceding one of the first and second identification numbers has a precedence of selection to the other, and wherein the second step includes responding to a combination of the identification data and the first and second identification numbers for sequentially selecting to provide those of a pluality of divided images of the reference image corresponding to the first and second identifiable images.

9. A motion picture coding method according to claim 6, wherein the first step includes providing a combination of first said current image defined by first said concerned region and first said set of pixel data of addressed pixels thereon and second said current image defined by second said concerned region and second said set of pixel data of addressed pixels thereon, and wherein the identifying data set comprises:

an identification data for identifying the combination of said first and second concerned regions in the entire region of the motion picture;

a first identification number for identifying said first concerned region in the combination of said first and second concerned regions;

a second identification number for identifying said second concerned region in the combination of said first and second concerned regions; and a composition data for defining an overlap precedence between an arbitrary one of the addressed pixels on said first concerned region and a corresponding one of the addressed pixels on said second concerned region.

10. A motion picture decoding method for decoding a symbol sequence representing a detected configuration of a concerned region identified in an entire region of a motion picture, a detected motion between a current image defined by a combination of the concerned region and a set of pixel data of addressed pixels thereon and a reference image representative of a previous image of the current image in a current frame, a difference image between the current image and a prediction image thereof generated by motion-compensating the reference image with the detected motion, and an identifying data set for identifying the concerned region in an entire region of the motion picture, the method comprising the steps of:

a first step of decoding the symbol sequence to provide a decoded configuration representing the detected configuration, a decoded motion representing the detected motion, a decoded image of the difference image, and a decoded data set representing the identifying data set;

a second step of responding to the decoded motion to motion-compensate a representative image of the reference image in the current frame to generate a decoded image of the prediction image;

a third step of adding the decoded image of the difference image to the decoded image of the prediction image to provide a decoded image of the current image;

a fourth step of correcting a configuration of the decoded image of the current image in accordance with the decoded configuration to provide a corrected image of the decoded image of the current image; and a fifth step of responding to the decoded data set to store the corrected image in an identifiable manner to be read as the representative image in a subsequent frame of the current frame, wherein the concerned region comprises a first split region and a second split region so that the current image is composed of a first identifiable image on the first split region and a second identifiable image on the second split region, wherein the identifying data set comprises an identification data for identifying the concerned region in the entire region of the motion picture, a first identification number for identifying the first split region of the concerned region, a second identification number for identifying the second concerned region of the concerned region, wherein the first and second identifiable images are sequentially provided so that a preceding on the first and second identification numbers has a precedence of selection to the other, wherein the decoded data set includes data representing the identification data, the first and second identification numbers and the precedence of selection, and wherein the corrected image comprises a first corrected image representing the first identifiable image a second corrected image representing the second identifiable image.

11. A motion picture decoding method according to claim 10, wherein the symbol sequence further represents an identifying data set for identifying the concerned region in an entire region of the motion picture, wherein the first step includes decoding the symbol sequence so that the identifying data set is decoded as a data set, and wherein the method further comprises a fifth step of responding to the decoded data set to store the corrected image in an identifiable manner to be read as the representative image in a subsequent frame of the current frame.

12. A motion picture decoding method according to claim 11, wherein the concerned region comprises a first split region and a second split region so that the current image is composed of a first identifiable image on the first split region and a second identifiable image on the second split region, wherein the identifying data set comprises:

an identification data for identifying the concerned region in the entire region of the motion picture;

a first identification number for identifying the first split region of the concerned region; and a second identification number for identifying the second split region of the concerned region, wherein the first and second identifiable images are sequentially provided so that a preceding one of the first and second identification numbers has a precedence of selection to the other, wherein the decoded data set includes data representing the identification data, the first and second identification numbers and the precedence of selection, wherein the corrected image comprises a first corrected image representing the first identifiable image and a second corrected image representing the second identifiable image, and wherein the fifth step includes responding to the decoded data set so that the first and second corrected images are sequentially stored in the identifiable manner.

* * * * *